United States Patent
Suarez Sandoval

(10) Patent No.: US 12,463,466 B2
(45) Date of Patent: Nov. 4, 2025

(54) TECHNIQUES FOR WIRELESS POWER TRANSFER

(71) Applicant: HUAWEI TECHNOLOGIES CO., LTD., Shenzhen (CN)

(72) Inventor: Fralett Suarez Sandoval, Nuremberg (DE)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/359,708

(22) Filed: Jul. 26, 2023

(65) Prior Publication Data

US 2023/0369896 A1 Nov. 16, 2023

Related U.S. Application Data

(63) Continuation of application No. PCT/EP2021/051673, filed on Jan. 26, 2021.

(51) Int. Cl.
 *H02J 50/12* (2016.01)
 *H02J 50/00* (2016.01)
 *H01F 38/14* (2006.01)

(52) U.S. Cl.
 CPC .......... *H02J 50/12* (2016.02); *H02J 50/005* (2020.01); *H01F 38/14* (2013.01)

(58) Field of Classification Search
 CPC ........ H02J 50/12; H02J 50/005; H02J 50/402; H01F 38/14
 See application file for complete search history.

(56) References Cited

U.S. PATENT DOCUMENTS

| | | | |
|---|---|---|---|
| 9,515,379 B2 | 12/2016 | Alexopoulos et al. | |
| 10,283,997 B2* | 5/2019 | Satyamoorthy | H04B 5/79 |
| 10,608,339 B2* | 3/2020 | Lee | H01Q 7/00 |
| 2014/0091636 A1 | 4/2014 | Ofstein et al. | |
| 2014/0184155 A1 | 7/2014 | Cha | |
| 2017/0302112 A1 | 10/2017 | Maniktala | |
| 2018/0343041 A1 | 11/2018 | Luzinski et al. | |
| 2019/0109373 A1 | 4/2019 | Ahn et al. | |
| 2020/0021135 A1 | 1/2020 | Lee et al. | |
| 2020/0067350 A1 | 2/2020 | Moffatt | |
| 2024/0048002 A1* | 2/2024 | Lebens | H04B 5/73 |

FOREIGN PATENT DOCUMENTS

| | | |
|---|---|---|
| CN | 110112834 A | 8/2019 |
| JP | 2015019547 A | 1/2015 |
| WO | 2016108949 A1 | 7/2016 |
| WO | 2017044973 A1 | 3/2017 |
| WO | 2018082769 A1 | 5/2018 |

* cited by examiner

*Primary Examiner* — Daniel Cavallari
(74) *Attorney, Agent, or Firm* — Leydig, Voit & Mayer, Ltd.

(57) ABSTRACT

A wireless power transmitter device is provided. The wireless power transmitter device comprises: at least one transmitter coil acting as inductive element of at least one inductive-capacitive resonator that upon excitation with a time-varying voltage produces a time varying electromagnetic field, causing a circulating electric field through at least one receiver coil of a wireless power receiver device for charging the wireless power receiver device, wherein the at least one transmitter coil is composed of at least two spirals electrically connected to each other, wherein the at least two spirals are oriented in space to form a composed geometric figure. A corresponding wireless power receiver device is further provided.

16 Claims, 25 Drawing Sheets

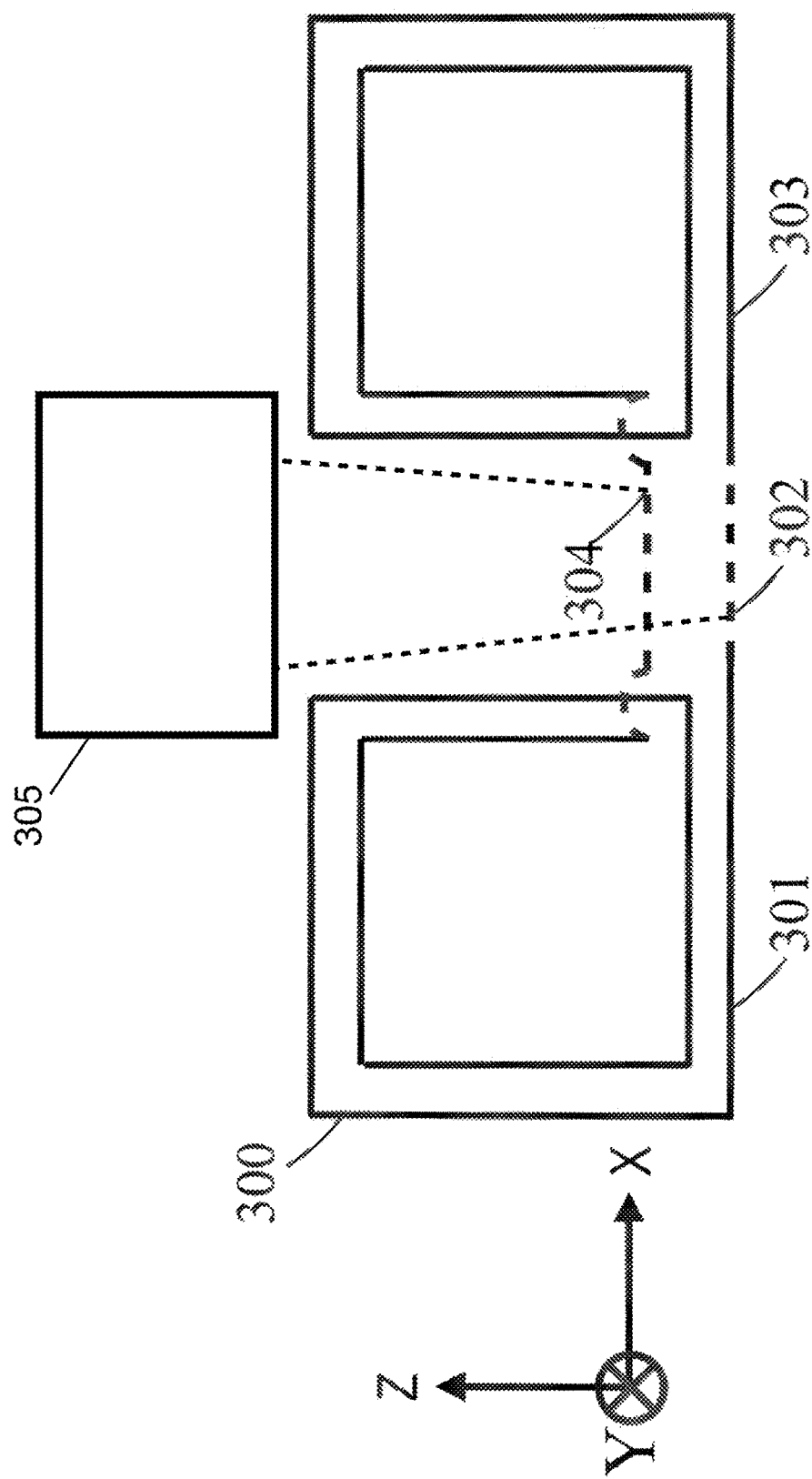

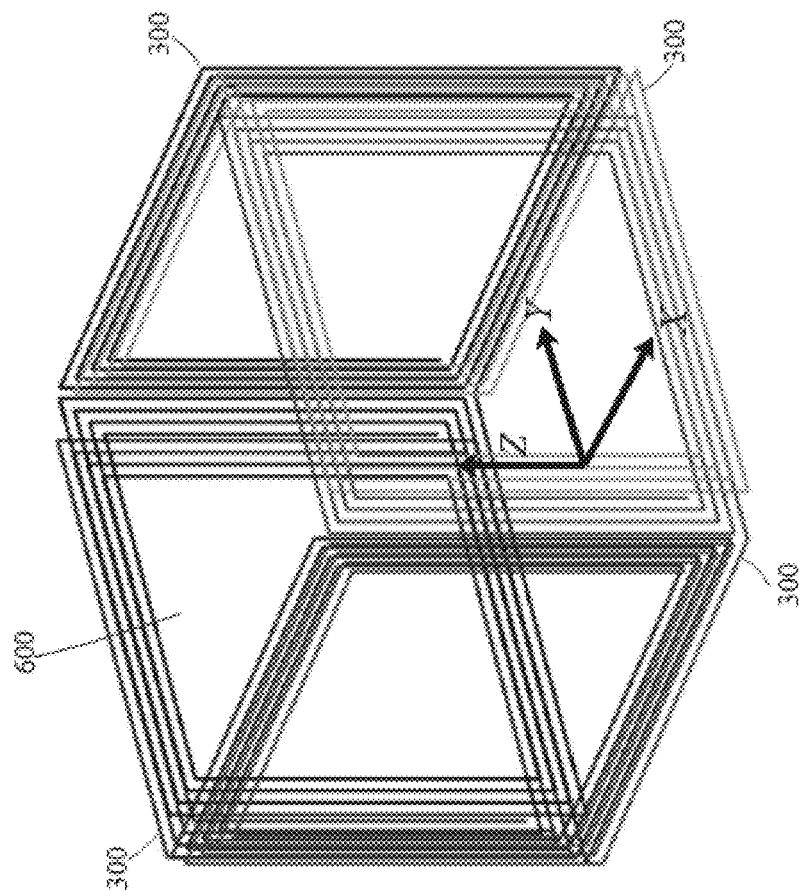
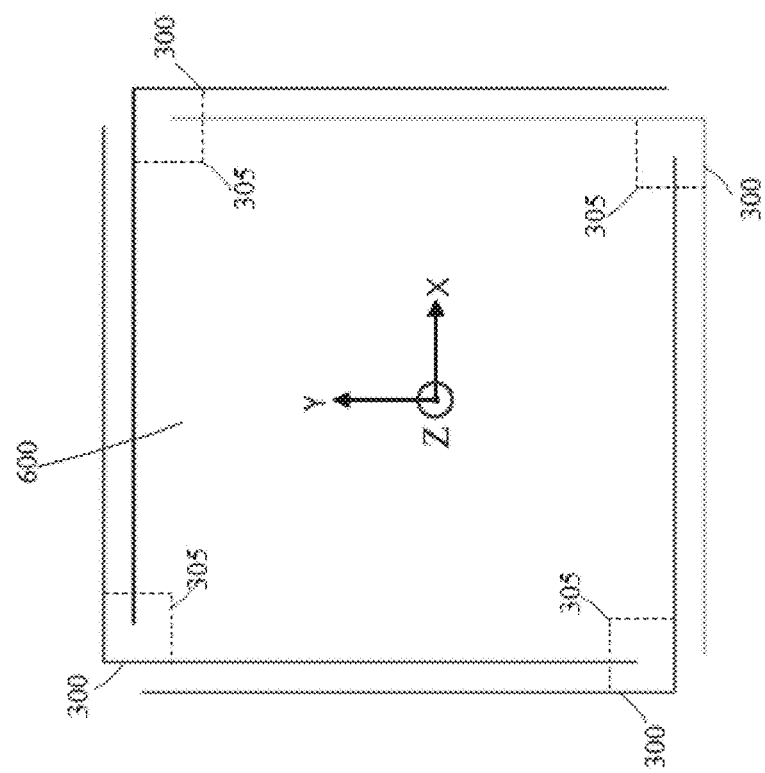
Fig. 6A
Fig. 6B

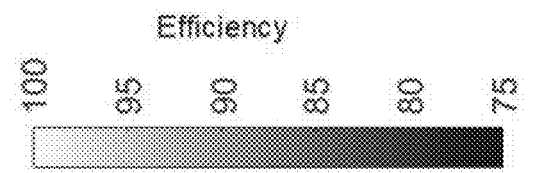
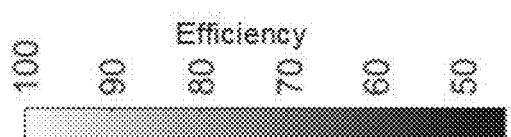
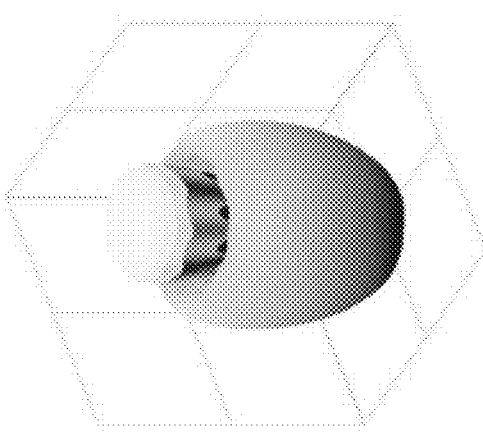
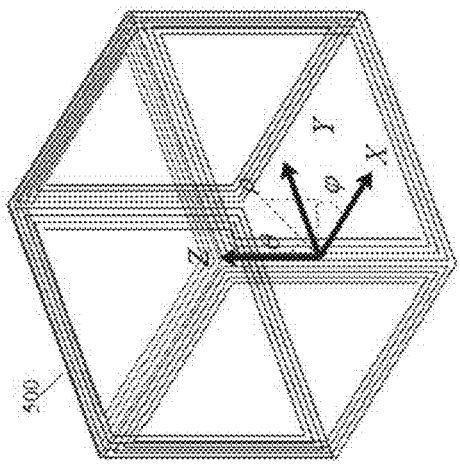

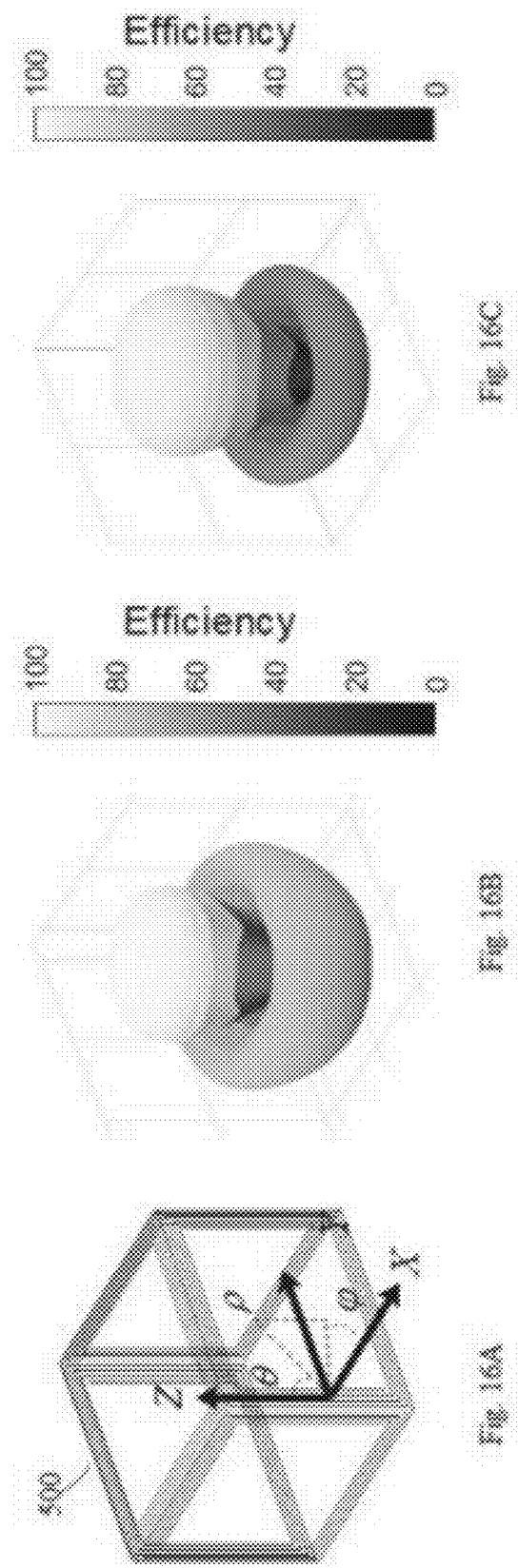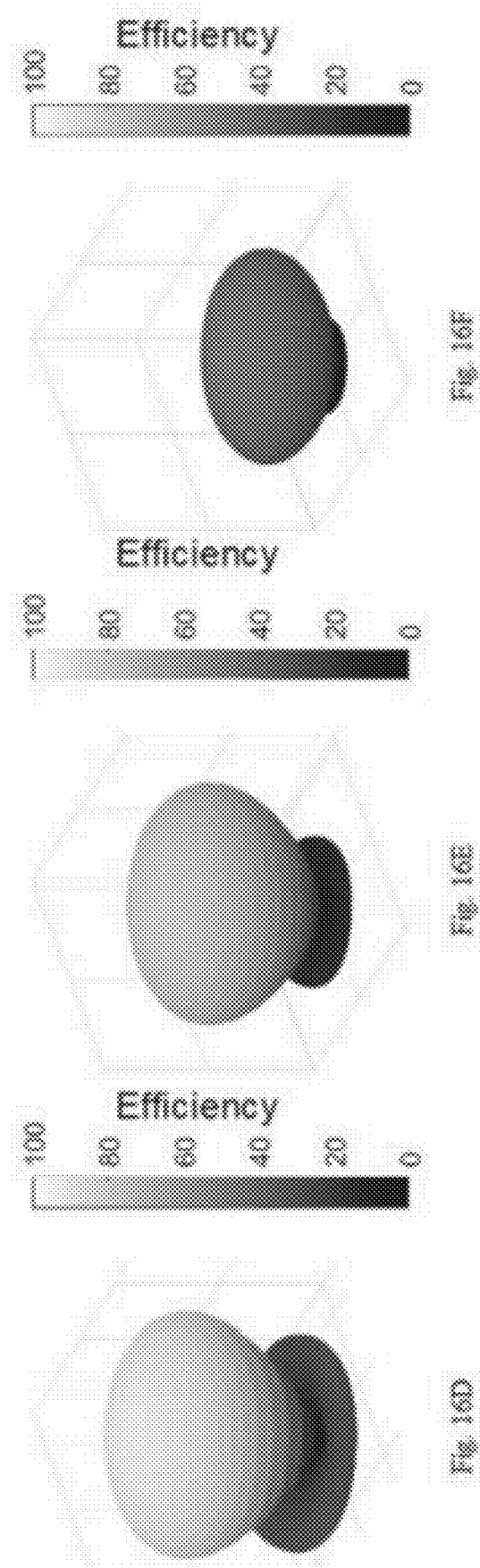
Fig. 16A Fig. 16B Fig. 16C Fig. 16D Fig. 16E Fig. 16F

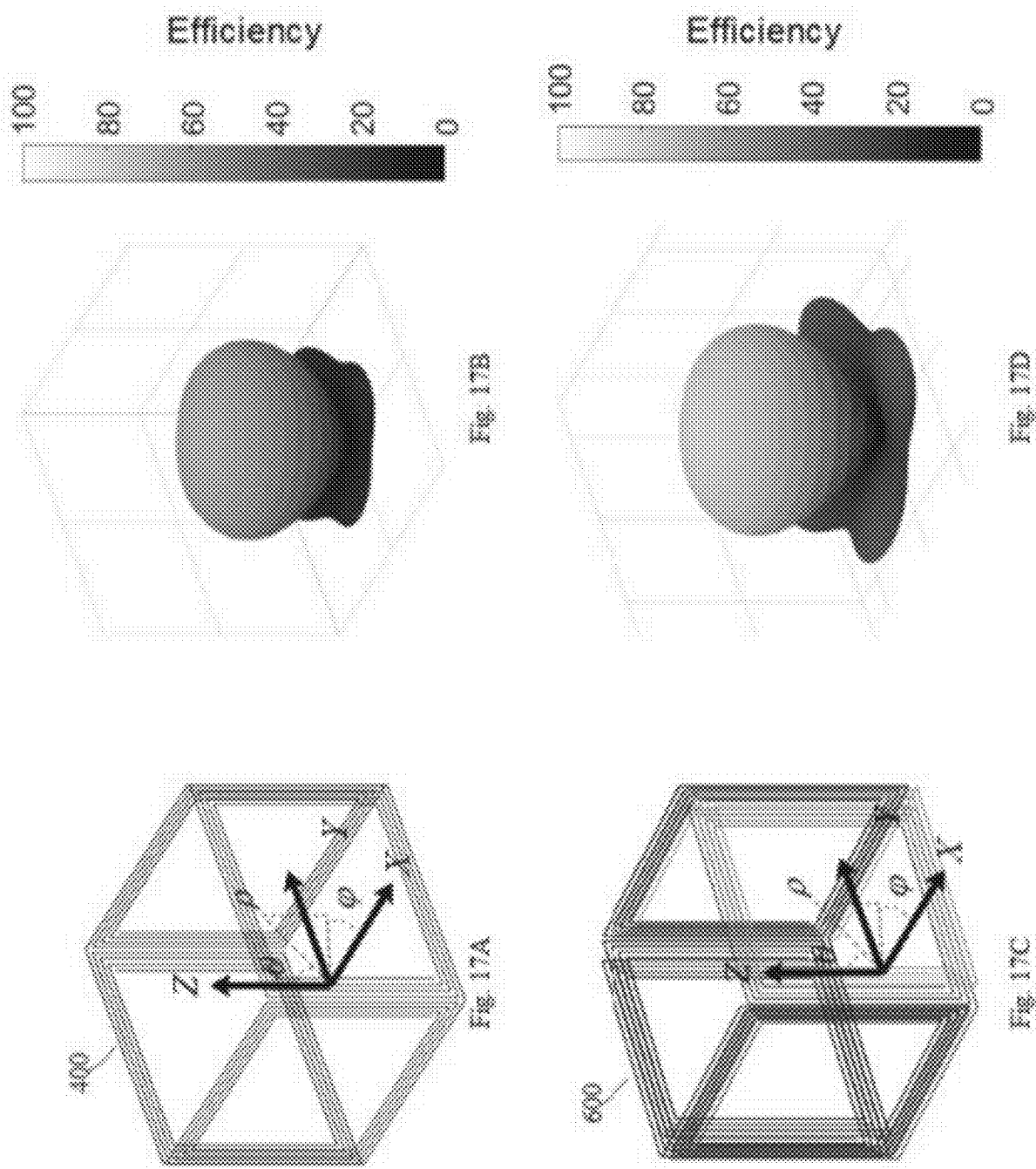

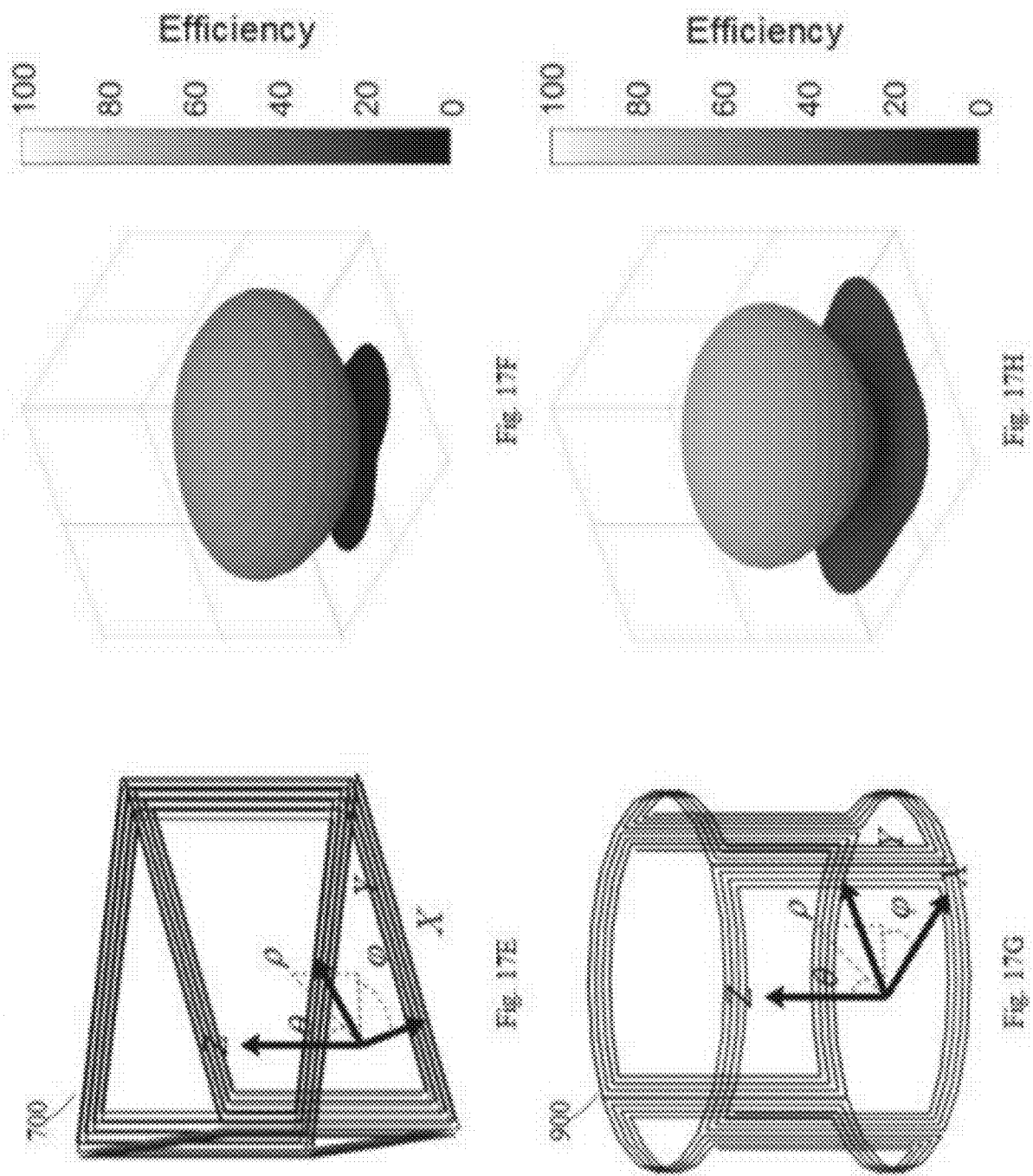

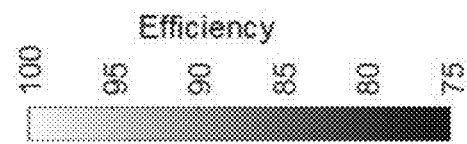
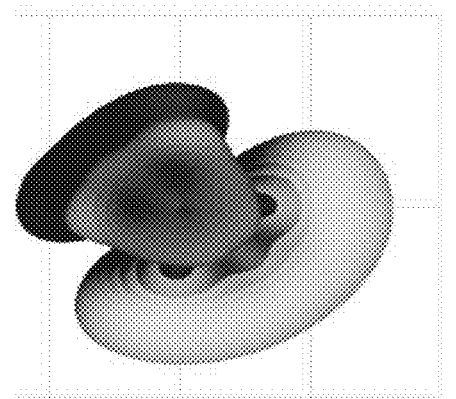
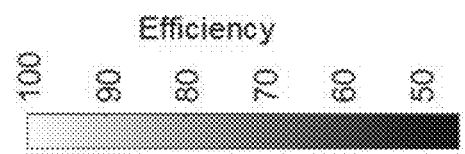
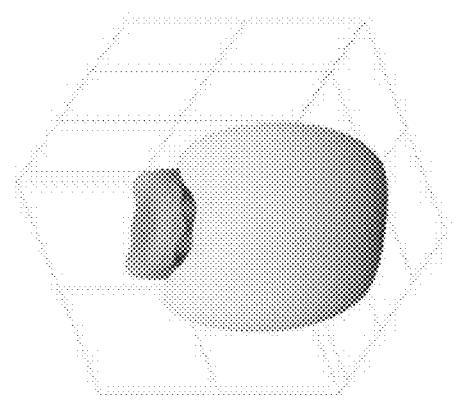
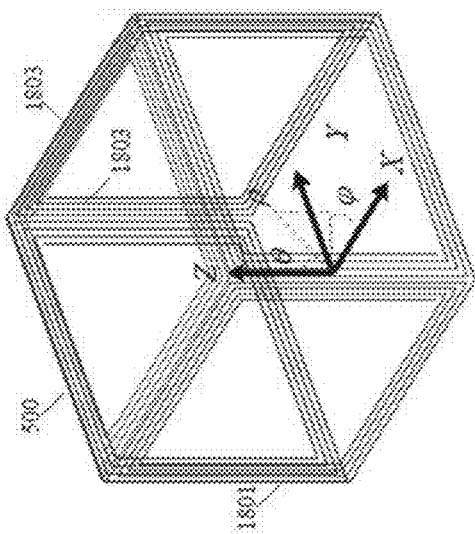
Fig. 18A  Fig. 18B  Fig. 18C

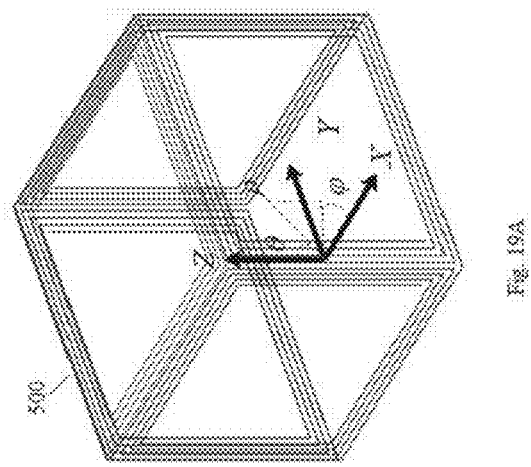
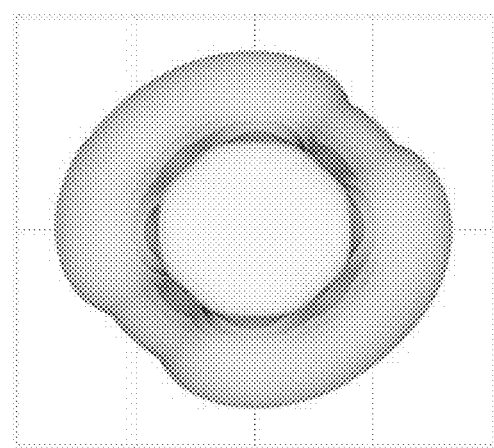
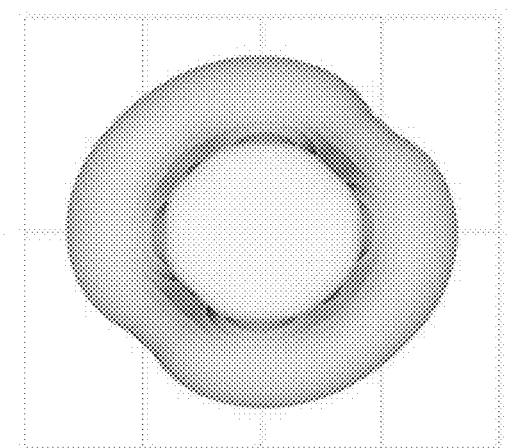
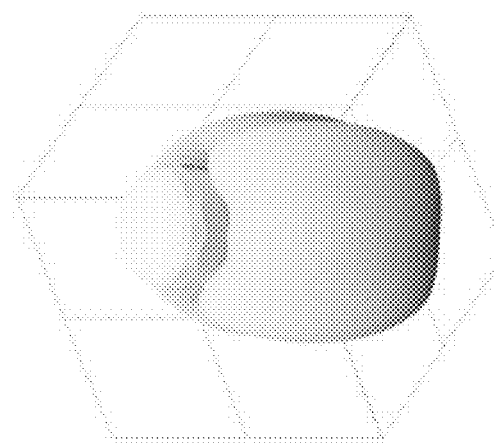
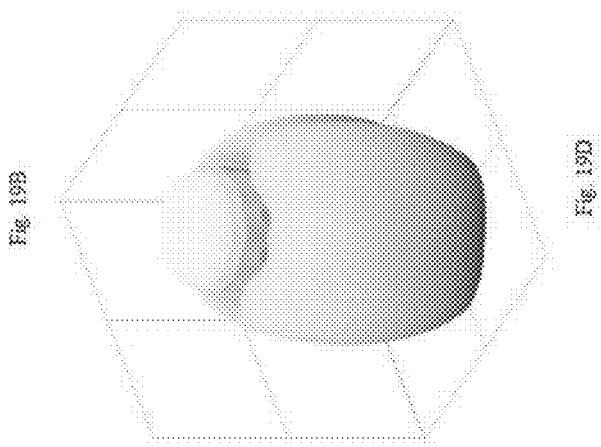
Fig. 19A
Fig. 19B
Fig. 19C
Fig. 19D
Fig. 19E

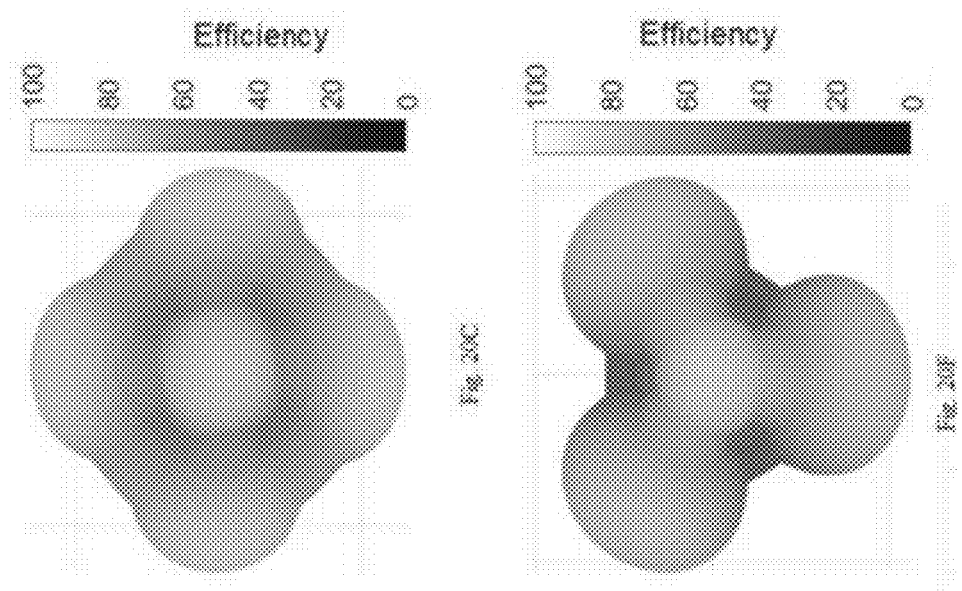
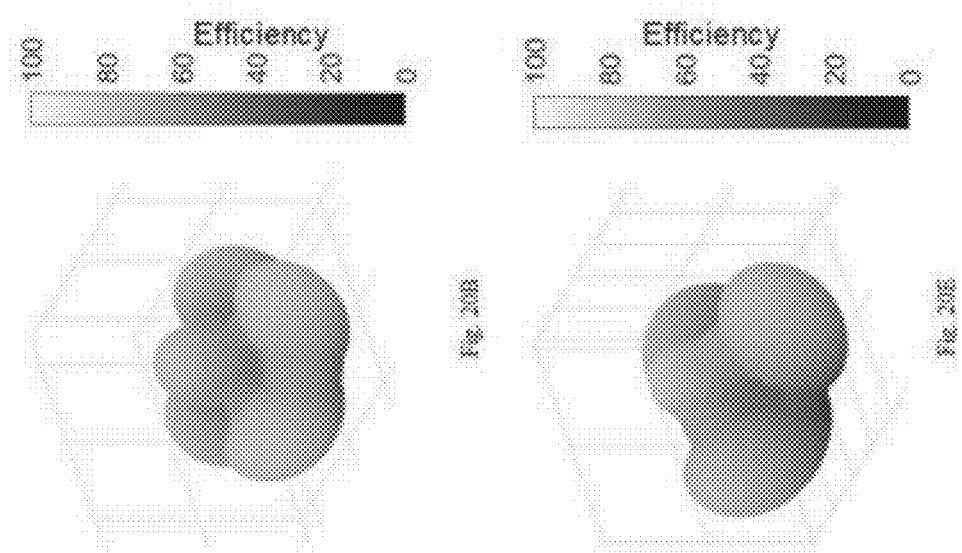
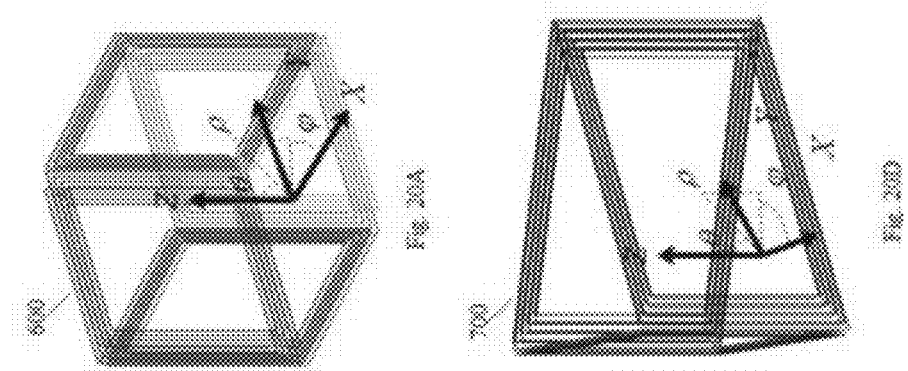

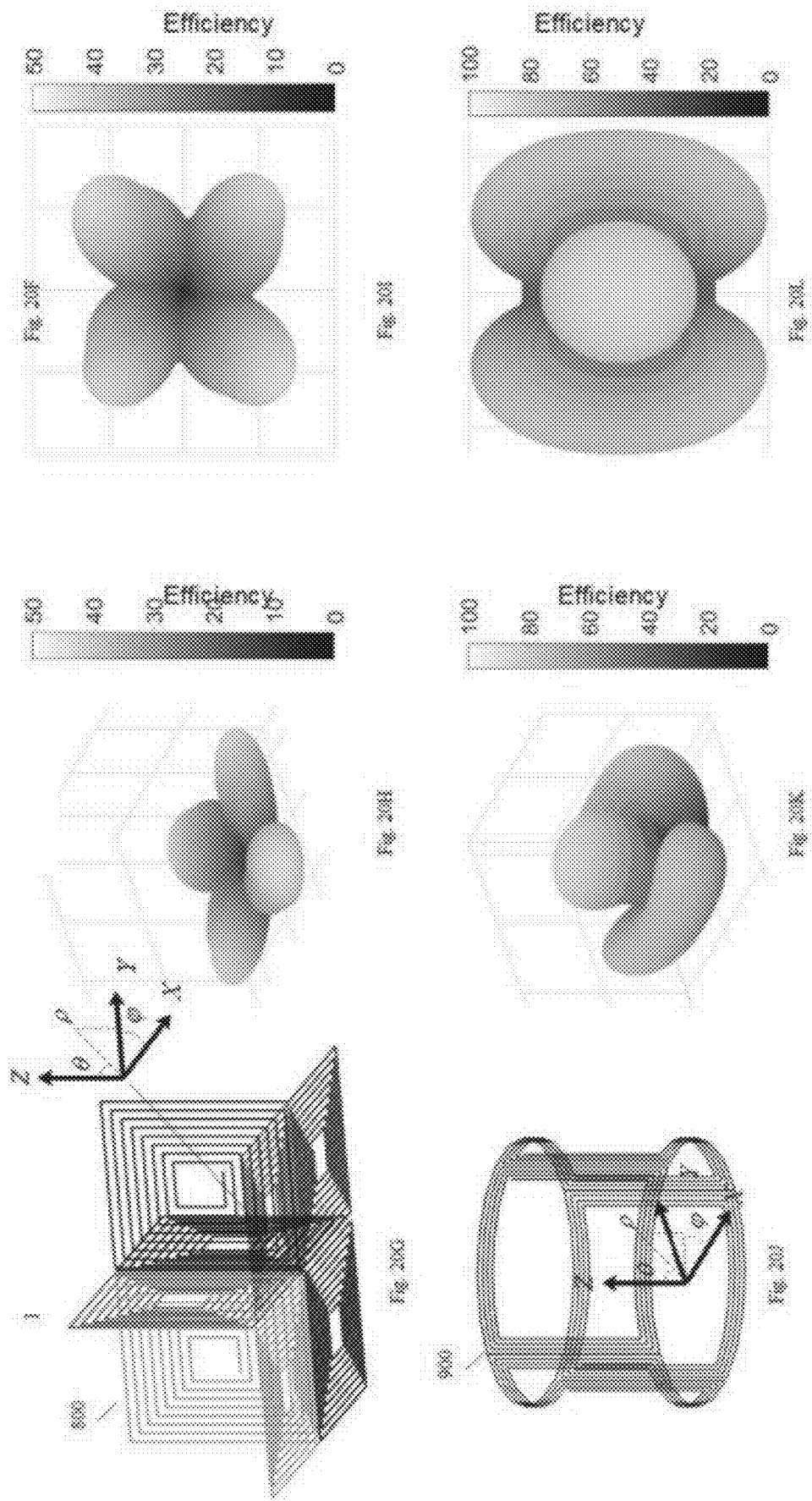

TECHNIQUES FOR WIRELESS POWER TRANSFER

CROSS-REFERENCE TO RELATED APPLICATIONS

This application is a continuation of International Application No. PCT/EP2021/051673, filed on Jan. 26, 2021, the disclosure of which is hereby incorporated by reference in its entirety.

TECHNICAL FIELD

Embodiments of the present disclosure relate to the field of wireless power transfer, in particular to systems, devices and processes that use wireless power transfer (WPT) technologies.

BACKGROUND

Nowadays the number of battery-powered electronic devices is increasing rapidly because they provide freedom of movement and portability. These devices should be continuously recharged to ensure they function. Their charging frequency can be diminished by the use of a large battery, but these impact the overall cost of the electronic device, as well as their weight and size. Charging of battery-powered electronic devices is usually done with the use of a wall charger and a dedicated cable. Disadvantages of this charging mechanism are that the connector is susceptible to mechanical failure due to the connection/disconnection cycles required to charge the battery, each battery-powered device comes with its dedicated cable which is not interchangeable between devices; the use of a cable restricts the mobility of the user. In order to avoid these disadvantages, several methods for wireless power transfer have been proposed in recent history.

However, existing wireless power transfer systems suffer from reduced positioning freedom of the receiver device(s) because the wireless power transfer efficiency is affected by the coupling conditions of the receiver. Making this type of technology highly sensitive to lateral or angular misalignments between the transmitter and receiver devices causing that the receiver device is not properly charged or even not charged at all in some locations. There is further difficulty to efficiently supply to multiple receiving devices simultaneously.

SUMMARY

Embodiments of the present disclosure provide a solution for wireless power transfer without the above described disadvantages.

In particular, embodiments of the present disclosure provide a mechanism for a high efficiency wireless power transfer in which the receiver device(s) have improved positioning freedom and in which multiple receiver devices can be simultaneously supplied.

The present disclosure presents a mechanism for wireless power transfer that provides efficient wireless power transmission with a high-degree of positioning freedom to the receivers, that is able to simultaneously and efficiently charge several receivers, in particular at extended transmission distances, having the capabilities to reduce the wireless transfer of power to certain, unused locations, that is, to be able to segment the active volume, and, that can provide a more uniform magnetic field around the volume of the transmitter device.

The concept described in this disclosure presents coil geometries composed of at least two spirals electrically connected to each other and folded at sharp angles or smoothly bent with respect to one another as the inductive component of transmitter and/or receiver resonant circuits of wireless power transfer systems (WPT) with single or a plurality of transmitter and receiver resonators. These coils are used as the building blocks of arrays composed of multiple composed coils.

An apparatus is presented comprising coil transmitter arrangements made of composed coils that provide uniform magnetic field in multiple directions, they can direct the magnetic field towards certain locations; and a system controller configured to control the magnetic field according to the receiver(s) position and orientation by employing a simplified control algorithm that adjusts either the amplitude or phase of the AC power supplies connected to each transmitter resonator in the array. The presented coil arrangements can also serve as receiver devices and the coil array can be designed according to the shape of the receiver device.

This disclosure further describes the operation of an adjustable capacitor network circuit coupled to the three-dimensional array to dynamically adjust the impedance of the transmitter coils with respect to a change in the coupling conditions of the receiver device to be charged.

In this disclosure, systems, methods and devices relying on wireless power transfer (WPT) are described. Wireless power transfer is the transmission of electrical energy without the use of wires as a physical link. This technology uses a transmitter device capable of generating a time-varying electromagnetic field that causes a circulating electric field through a receiver device (or devices) based on the principle of electromagnetic induction. The receiver device (or devices) is (are) capable of being supplied directly from this circulating electric field or they convert it to a suitable power level to supply to an electrical load or battery connected to them.

Commercial wireless power transfer systems have mainly been driven by two organizations, the Wireless Power Consortium and the AirFuel Alliance. The Wireless Power Consortium created the Qi Standard to wirelessly charge consumer electronic devices using magnetic induction from a base station, usually a thin mat-like object, containing one or more transmitter coils and a target device fitted with a receiving coil. Qi systems require close proximity of the transmitter and receiver devices, usually within a couple of millimeters to a couple of centimeters. Wireless power transfer systems that function under the AirFuel Alliance principle use a resonant inductive coupling between the transmitter coil and the receiver coil to consequently charge the battery connected to the receiver device. The resonant coupling allows for the power to be transferred over greater distances.

Components, systems, methods, and devices are described to wirelessly supply to or charge the battery of electronic devices (e.g. smartphones, tablets, smart glasses, earphones, wearables, etc.), compact robots using electromagnetic wireless power transfer. The wireless power transfer systems described herein use resonant inductive coupling between the transmitter resonator(s) and the receiver resonator(s). In some aspects, the systems are capable of simultaneously supply to multiple receiver devices with severe angular misalignment with respect to the transmitter resonator(s) and at any or many locations inside a charging volume extending outside or inside of the transmitter resonator(s). The receiver(s) does not need to have a defined position or orientation to be supplied or be charged.

In another aspect the wireless power transfer efficiency between the transmitter resonator array and movable receivers is shown to be uniform around a volume of the transmitter arrangements, meaning that the systems are capable of supplying to multiple receiver devices simultaneously when the system is subjected to changing coupling conditions of the receiver. Furthermore, two control methods are disclosed in order to increment the efficiency even further. The disclosed control methods are based on either applying a different phase for the AC (alternating current) sources supplying to the transmitter resonators while maintaining the same amplitude or by applying different amplitude to each source while maintaining the same phase. Two possible receiver sensing mechanisms are disclosed as well.

A controller or controlling device as described in this disclosure is any device that can be utilized for controlling specific tasks (or blocks or steps). A controller or controlling device can be a single micro-controller or processor or a multi-core processor or can include a set of micro-controllers or processors or can include means for controlling and/or processing. The controller can perform specific control tasks, for example controlling a device, according to a software, hardware or firmware application.

According to a first aspect, the disclosure relates to a wireless power transmitter device, the wireless power transmitter device comprising: at least one transmitter coil acting as inductive element of at least one inductive-capacitive resonator that upon excitation with a time-varying voltage produces a time varying electromagnetic field causing a circulating electric field through at least one receiver coil of a wireless power receiver device for charging the wireless power receiver device, wherein the at least one transmitter coil is composed of at least two spirals electrically connected to each other, wherein the at least two spirals are oriented in space to form a composed geometric figure.

Such a wireless power transmitter device provides a high efficiency wireless power transfer. The wireless receiver device(s) have improved positioning freedom. Multiple receiver devices can be simultaneously supplied with power. The wireless power transmitter device provides efficient wireless power transmission with a high degree of positioning freedom to the receivers. The wireless power transmitter device can simultaneously and efficiently charge several receivers, in particular at extended transmission distances. The wireless power transmitter device has the capability to reduce the wireless transfer of power to certain, unused locations, that is, the wireless power transmitter device is able to segment the active volume, and, that can provide a more uniform magnetic field.

In an implementation of the wireless power transmitter device, the at least two spirals are symmetrically positioned in space towards a common reference point or axis.

This provides the advantage that a symmetrical magnetic field can be generated around the transmitter device.

In an implementation of the wireless power transmitter device, the at least two spirals are folded or bent with respect to one another or are located next to each other with the same height or at a different height.

This provides the advantage that different configurations of the spirals can be exploited. Thus, a configuration can be used that can optimally homogenize the magnetic field around the transmitter device.

In an implementation of the wireless power transmitter device, the at least one transmitter coil comprises: a first port formed by a first wire end of a first spiral of the at least two spirals; a second port formed by a first wire end of a second spiral of the at least two spirals; a third port formed by a second wire end of the first spiral of the at least two spirals; and a fourth port formed by a second wire end of the second spiral of the at least two spirals.

This provides the advantage that the wireless power transmitter device can be realized as a four-port device providing improved flexibility.

In an implementation of the wireless power transmitter device, the at least one transmitter coil comprises: a first electrical connection electrically connecting one of the two ports of the first spiral with one of the two ports of the second spiral; a second electrical connection electrically connecting the other port of the two ports of the first spiral with the other port of the two ports of the second spiral.

This provides the advantage that these two electrical connections can be formed to improve the shape of the magnetic field around the wireless power transmitter device.

In an implementation of the wireless power transmitter device, the first electrical connection joins the first spiral with the second spiral by a material of the same or a different conductivity than a material of the spirals.

This provides the advantage that different materials can be used for shaping the magnetic field generated around the spirals.

In an implementation of the wireless power transmitter device, the second electrical connection connects the first spiral and the second spiral to a capacitor or capacitor network, wherein an equivalent capacitance of the capacitor or capacitor network is used to create an electrical resonator at a resonance frequency in conjunction with a self-inductance of the at least one transmitter coil, wherein the electrical resonator is driven by an AC source.

This provides the advantage that the capacitor or capacitor network can be used to adjust the resonance frequency of the electrical resonator of the transmitter coils.

In an implementation of the wireless power transmitter device, at least one of the first spiral and the second spiral have segmented turns; and the equivalent capacitance of the capacitor or capacitor network is connected to segments of the segmented turns of the at least one of the first spiral and the second spiral.

This provides the advantage that the segmented turns of the spirals can be used to adjust the resonance frequency of the electrical resonator of the transmitter coils.

In an implementation of the wireless power transmitter device, the first electrical connection joins the first spiral and the second spiral by an impedance or impedance network in order to modify an overall impedance of the at least one transmitter coil.

This provides the advantage that the impedance or impedance network can be used to adjust the resonance frequency of the electrical resonator of the transmitter coils.

In an implementation of the wireless power transmitter device, the at least two spirals have a circular, elliptical or polygonal shape, in particular triangular, square, rectangular, pentagonal or hexagonal.

This provides the advantage that flexible design options for the wireless power transmitter device exist.

In an implementation of the wireless power transmitter device, each of the at least two spirals has the same or a different shape.

This provides the advantage that a flexible design can be utilized.

In an implementation of the wireless power transmitter device, each of the at least two spirals has the same or a different winding direction.

This provides the advantage that the direction of the magnetic field can be adjusted.

In an implementation of the wireless power transmitter device, each of the at least two spirals is composed of a high permeability magnetic or composite magnetic core material or of a low permeability dielectric core material, in particular glass-reinforced epoxy laminate material (FR4).

This provides the advantage of high efficiency in electromagnetic transmission.

In an implementation of the wireless power transmitter device, the at least two spirals are mechanically attached to a flexible carrier substrate, in particular FR4, polyimide, polymer, to retain their folded or bended shape.

This provides the advantage that the coils can be flexibly shaped from one shape to another and go back to their original shape.

In an implementation, the wireless power transmitter device comprises at least two transmitter coils, wherein a first transmitter coil of the at least two transmitter coils faces a second transmitter coil of the at least two transmitter coils under a folding angle of about 90 degrees, wherein the first and the second transmitter coils are positioned at the same or different height with respect to each other.

This provides the advantage that the wireless power transmitter device can provide a uniform magnetic field in multiple directions.

In an implementation, the wireless power transmitter device further comprises a single-spiral coil that is located on top of the first and the second transmitter coils.

This provides the advantage that the wireless power transmitter device can provide a uniform magnetic field in multiple directions.

In an implementation, the wireless power transmitter device comprises four transmitter coils, each transmitter coil composed of a first and a second spiral arranged with respect to each other under a folding angle of about 90 degrees, wherein all four transmitter coils are arranged with respect to each other under a folding angle of about 90 degrees, wherein each first spiral of a transmitter coil of the four transmitter coils overlaps with a second spiral of another transmitter coil of the four transmitter coils located next to the transmitter coil.

This provides the advantage that the wireless power transmitter device can provide a uniform magnetic field in multiple directions.

In an implementation, the wireless power transmitter device comprises three transmitter coils, each transmitter coil composed of a first and a second spiral arranged with respect to each other under a folding angle of about 60 degrees, wherein all three transmitter coils are arranged with respect to each other under a folding angle of about 60 degrees, wherein each first spiral of a transmitter coil of the three transmitter coils overlaps with a second spiral of another transmitter coil of the three transmitter coils located next to the transmitter coil.

This provides the advantage that the wireless power transmitter device can provide a uniform magnetic field in multiple directions.

In an implementation, the wireless power transmitter device comprises four transmitter coils, each transmitter coil composed of a first and a second spiral arranged with respect to each other under a folding angle of about 90 degrees, wherein all four transmitter coils are arranged with respect to each other under a folding angle of about 90 degrees, wherein the first spirals of the four transmitter coils are arranged in a first plane, wherein the second spirals of two transmitter coils of the four transmitter coils are arranged in a second plane perpendicular to the first plane, and wherein the second spirals of the other two transmitter coils of the four transmitter coils are arranged in a third plane perpendicular to both the first and the second plane.

This provides the advantage that the wireless power transmitter device can provide a uniform magnetic field in multiple directions.

In an implementation, the wireless power transmitter device comprises two transmitter coils, each transmitter coil composed of a first and a second spiral which are bent with respect to each other under a radius of curvature, wherein the two transmitter coils are bent with respect to each other under a radius of curvature.

This provides the advantage that the wireless power transmitter device can provide a uniform magnetic field in multiple directions.

In an implementation, the wireless power transmitter device comprises an arrangement of at least two transmitter coils, wherein the arrangement of at least two transmitter coils has a cuboid, spherical or semi-planar shape.

This provides the advantage that the wireless power transmitter device can provide a magnetic field according to specific requirements.

In an implementation, the wireless power transmitter device is also acting as a wireless power receiver device, that upon receiving a time varying electromagnetic field produces a corresponding time-varying voltage at the at least one transmitter coil.

This provides the advantage that bidirectional wireless power transmission can be provided by such a transmitter device.

In an implementation, the wireless power transmitter device is acting both as a wireless power transmitter device and as a wireless power receiver device, to implement a wireless power relay for wireless power transmission from another wireless power transmitter device to another wireless power receiver device.

This provides the advantage that a wireless power relay can be implemented by such a transmitter device.

In an implementation, the wireless power transmitter device comprises: at least one AC power source providing the time-varying voltage for excitation of the at least one inductive-capacitive resonator of the at least one transmitter coil; and a phase and amplitude controller configured to control at least one of a magnitude or a phase of the at least one AC power source based on a sensing signal indicating a location of the wireless power receiver device.

This provides the advantage that the magnetic field generated by the wireless power transmitter device can be efficiently adjusted by the phase and amplitude controller.

In an implementation, the wireless power transmitter device comprises: a power detection unit, configured to detect a change in an electromagnetic coupling of the at least one inductive-capacitive resonator of the at least one transmitter coil with a corresponding resonator of the wireless power receiver device, wherein the power detection unit is configured to provide the sensing signal based on the detected change in the electromagnetic coupling of the at least one inductive-capacitive resonator of the at least one transmitter coil.

This provides the advantage that moving receiver devices can be efficiently supplied with energy.

In an implementation, the wireless power transmitter device comprises: a power detection unit, configured to detect a change in an electromagnetic coupling of at least one inductive-capacitive resonator of a sensing coil with a corresponding resonator of the wireless power receiver device, wherein the at least one inductive-capacitive resonator of the sensing coil is configured to operate at another operating frequency than the at least one inductive-capacitive resonator of the at least one transmitter coil, wherein the power detection unit is configured to provide the sensing signal based on the detected change in the electromagnetic coupling of the at least one inductive-capacitive resonator of the sensing coil.

This provides the advantage that moving receiver devices can be efficiently supplied with energy.

In an implementation, the wireless power transmitter device comprises a data processing and storage unit, configured to: sample and process an analogue voltage output of the power detection unit that includes the sensing signal, and set operation characteristics of the phase and amplitude controller based on the sensing signal.

This provides the advantage that a closed loop control can be implemented for optimal tracking to a moving receiver device.

In an implementation, the wireless power transmitter device comprises a wireless communication stage configured to: wireless communicate with a corresponding wireless communication stage of the wireless power receiver device, and set the operation characteristics of the phase and amplitude controller based on the wireless communication with the wireless power receiver device.

This provides the advantage that by such communication the operation characteristics of the wireless power transmitter device can be optimally adjusted, thereby increasing efficiency of power transmission.

According to a second aspect, the disclosure relates to a wireless power receiver device comprising: at least one receiver coil acting as inductive element of at least one inductive-capacitive resonator that upon receiving a time varying electromagnetic field from at least one corresponding inductive-capacitive resonator of a wireless power transmitter device produces a time-varying voltage at the at least one receiver coil for charging the wireless power receiver device, wherein the at least one receiver coil is composed of at least two spirals electrically connected to each other, wherein the at least two spirals are oriented in space to form a composed geometric figure.

Such a wireless power receiver device provides a high efficiency wireless power transfer. The wireless receiver device has improved positioning freedom. Multiple receiver devices can be simultaneously supplied with power. The wireless power receiver device can be efficiently supplied by wireless power transmission with a high degree of positioning freedom.

In an implementation of the wireless power receiver device, the at least two spirals are symmetrically positioned in space towards a common reference point or axis.

This provides the advantage that a symmetrical magnetic field can be generated around the receiver device.

In an implementation of the wireless power receiver device, the at least two spirals are folded or bent with respect to one another or are located next to each other with the same height or at a different height.

This provides the advantage that different configurations of the spirals can be exploited. Thus, a configuration can be used that can optimally homogenize the magnetic field around the receiver device to provide optimal interaction with the transmitter device.

In an implementation, the wireless power receiver device comprises at least two receiver coils, wherein a first receiver coil of the at least two receiver coils faces a second receiver coil of the at least two receiver coils under a folding angle of about 90 degrees, wherein the first and the second receiver coils are positioned at the same or different height with respect to each other.

This provides the advantage that the wireless power transmitter device can provide a uniform magnetic field in multiple directions.

In an implementation, the wireless power receiver device further comprises: an additional single-spiral coil that is located on top of the first and the second receiver coils.

This provides the advantage that the wireless power transmitter device can provide a uniform magnetic field in multiple directions.

In an implementation, the wireless power receiver device comprises four receiver coils, each receiver coil composed of a first and a second spiral arranged with respect to each other under a folding angle of about 90 degrees, wherein all four receiver coils are arranged with respect to each other under a folding angle of about 90 degrees, wherein each first spiral of a receiver coil of the four receiver coils overlaps with a second spiral of another receiver coil of the four receiver coils located next to the receiver coil.

This provides the advantage that the wireless power transmitter device can provide a uniform magnetic field in multiple directions.

In an implementation, the wireless power receiver device comprises three receiver coils, each receiver coil composed of a first and a second spiral arranged with respect to each other under a folding angle of about 60 degrees, wherein all three receiver coils are arranged with respect to each other under a folding angle of about 60 degrees, wherein each first spiral of a receiver coil of the three receiver coils overlaps with a second spiral of another receiver coil of the three receiver coils located next to the receiver coil.

This provides the advantage that the wireless power transmitter device can provide a uniform magnetic field in multiple directions.

In an implementation, the wireless power receiver device comprises four receiver coils, each receiver coil composed of a first and a second spiral arranged with respect to each other under a folding angle of about 90 degrees, wherein all four receiver coils are arranged with respect to each other under a folding angle of about 90 degrees, wherein the first spirals of the four receiver coils are arranged in a first plane, wherein the second spirals of two receiver coils of the four receiver coils are arranged in a second plane perpendicular to the first plane, and wherein the second spirals of the other two receiver coils of the four receiver coils are arranged in a third plane perpendicular to both the first and the second plane.

This provides the advantage that the wireless power transmitter device can provide a uniform magnetic field in multiple directions.

In an implementation, the wireless power receiver device comprises two receiver coils, each receiver coil composed of a first and a second spiral which are bent with respect to each other under a radius of curvature, wherein the two receiver coils are bent with respect to each other under a radius of curvature.

This provides the advantage that the wireless power transmitter device can provide a uniform magnetic field in multiple directions.

According to a third aspect, the disclosure relates to a method for charging a wireless power receiver device by a wireless power transmitter device, the wireless power transmitter device comprising at least one transmitter coil acting as inductive element of at least one inductive-capacitive resonator, wherein the at least one transmitter coil is composed of at least two spirals electrically connected to each other, wherein the at least two spirals are oriented in space to form a composed geometric figure, the method comprising: exciting the at least one transmitter coil with a time-varying voltage to produce a time varying electromagnetic field causing a circulating electric field through at least one receiver coil of the wireless power receiver device for charging the wireless power receiver device.

Such a charging method provides a high efficiency wireless power transfer. The wireless receiver device has improved positioning freedom. Multiple receiver devices can be simultaneously supplied with power.

According to a fourth aspect, the disclosure relates to a wireless power transfer system comprising a wireless power transmitter device according to the first aspect and a wireless power receiver device according to the second aspect.

Such a wireless power transfer system provides efficient wireless power transmission with a high degree of positioning freedom to the receivers. The system is able to simultaneously and efficiently charge several receivers, in particular at extended transmission distances, having the capabilities to reduce the wireless transfer of power to certain, unused locations, that is, the system is able to segment the active volume, and, can provide a more uniform magnetic field around the volume of the transmitter device.

BRIEF DESCRIPTION OF THE DRAWINGS

Further embodiments of the present disclosure will be described with respect to the following figures, in which:

FIG. 3A shows a schematic diagram illustrating an composed coil geometry 300 according to the disclosure;

FIG. 6A shows a schematic diagram illustrating inductive elements of a wireless power transmitter arrangement 600 composed by four composed coils 300 according to an example;

FIG. 6B shows a 3-dimensional representation of the wireless power transmitter arrangement 600 of FIG. 6A;

FIG. 15A shows a 3-dimensional representation of the wireless power transmitter arrangement 500 of FIGS. 5A and 5B;

FIG. 15B shows a 3-dimensional field diagram of the wireless power transmission efficiency between the wireless power transmitter arrangement 500 of FIG. 15A and a receiver resonator with a certain load in a top view;

FIG. 15C shows a 3-dimensional field diagram of the wireless power transmission efficiency between the wireless power transmitter arrangement 500 of FIG. 15A and a receiver resonator with a certain load in a side view;

FIG. 16A shows a 3-dimensional representation of the wireless power transmitter arrangement 500 of FIGS. 5A and 5B;

FIG. 16B to 16F show 3-dimensional field diagrams illustrating wireless power transmission efficiency between the transmitter arrangement of FIG. 16A and a receiver according to FIG. 14 for an increasing radius from the origin of the transmitter arrangement 500;

FIG. 17A shows a 3-dimensional representation of the wireless power transmitter arrangement 400 of FIGS. 4A and 4B;

FIG. 17B shows an 3-dimensional field diagram illustrating wireless power transmission efficiency between the transmitter arrangement of FIG. 17A and a receiver according to FIG. 14 for a constant radius from the origin of the transmitter arrangement 400;

FIG. 17C shows a 3-dimensional representation of the wireless power transmitter arrangement 600 of FIGS. 6A and 6B;

FIG. 17D shows an 3-dimensional field diagram illustrating wireless power transmission efficiency between the transmitter arrangement of FIG. 17C and a receiver according to FIG. 14 for a constant radius from the origin of the transmitter arrangement 600;

FIG. 17E shows a 3-dimensional representation of the wireless power transmitter arrangement 700 of FIGS. 7A and 7B;

FIG. 17F shows an 3-dimensional field diagram illustrating wireless power transmission efficiency between the transmitter arrangement of FIG. 17E and a receiver according to FIG. 14 for a constant radius from the origin of the transmitter arrangement 700;

FIG. 17G shows a 3-dimensional representation of the wireless power transmitter arrangement 900 of FIGS. 9A and 9B;

FIG. 17H shows an 3-dimensional field diagram illustrating wireless power transmission efficiency between the transmitter arrangement of FIG. 17G and a receiver according to FIG. 14 for a constant radius from the origin of the transmitter arrangement 900;

FIG. 18A shows a 3-dimensional representation of the wireless power transmitter arrangement 500 of FIGS. 5A and 5B;

FIG. 18B shows an 3-dimensional field diagram in a top view illustrating wireless power transmission efficiency between the transmitter arrangement of FIG. 18A and a moving receiver according to FIG. 14 at a constant radius from the origin of the transmitter arrangement 500;

FIG. 18C shows an 3-dimensional field diagram in a side view illustrating wireless power transmission efficiency between the transmitter arrangement of FIG. 18A and a moving receiver according to FIG. 14 at a constant radius from the origin of the transmitter arrangement 500;

FIG. 19A shows a 3-dimensional representation of the wireless power transmitter arrangement 500 of FIGS. 5A and 5B;

FIGS. 19B to 19C show 3-dimensional field diagrams in side view (FIG. 19B) and top view (FIG. 19C) illustrating wireless power transmission efficiency between the transmitter arrangement of FIG. 19A and a moving receiver according to FIG. 14 at a constant radius from the origin of the transmitter arrangement 500 when phase shifting control is applied;

FIGS. 19D to 19E show 3-dimensional field diagrams in side view (FIG. 19D) and top view (FIG. 19E) illustrating wireless power transmission efficiency between the transmitter arrangement of FIG. 19A and a moving receiver according to FIG. 14 at a constant radius from the origin of the transmitter arrangement 500 when amplitude control is applied;

FIG. 20A shows a 3-dimensional representation of the wireless power transmitter arrangement 600 of FIGS. 6A and 6B;

FIG. 20B shows a surface plot representing an 3-dimensional field diagram in a side view illustrating wireless power transmission efficiency between the transmitter arrangement of FIG. 20A and a moving receiver according to FIG. 14;

FIG. 20C shows a surface plot representing an 3-dimensional field diagram in a top view illustrating wireless power transmission efficiency between the transmitter arrangement of FIG. 20A and a moving receiver according to FIG. 14;

FIG. 20D shows a 3-dimensional representation of the wireless power transmitter arrangement 700 of FIGS. 7A and 7B;

FIG. 20E shows a surface plot representing an 3-dimensional field diagram in a side view illustrating wireless power transmission efficiency between the transmitter arrangement of FIG. 20D and a moving receiver according to FIG. 14;

FIG. 20F shows a surface plot representing an 3-dimensional field diagram in a top view illustrating wireless power transmission efficiency between the transmitter arrangement of FIG. 20D and a moving receiver according to FIG. 14;

FIG. 20G shows a 3-dimensional representation of the wireless power transmitter arrangement 800 of FIGS. 8A and 8B;

FIG. 20H shows a surface plot representing an 3-dimensional field diagram in a side view illustrating wireless power transmission efficiency between the transmitter arrangement of FIG. 20G and a moving receiver according to FIG. 14;

FIG. 20I shows a surface plot representing a 3-dimensional field diagram in a top view illustrating wireless power transmission efficiency between the transmitter arrangement of FIG. 20G and a moving receiver according to FIG. 14;

FIG. 20J shows a 3-dimensional representation of the wireless power transmitter arrangement 900 of FIGS. 9A and 9B;

FIG. 20K shows a surface plot representing a 3-dimensional field diagram in a side view illustrating wireless power transmission efficiency between the transmitter arrangement of FIG. 20J and a moving receiver according to FIG. 14; and FIG. 20L shows a surface plot representing a 3-dimensional field diagram in a top view illustrating wireless power transmission efficiency between the transmitter arrangement of FIG. 20J and a moving receiver according to FIG. 14.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a method step is described, a corresponding device may include a unit to perform the described method step, even if such unit is not explicitly described or illustrated in the figures. Further, it is understood that the features of the various aspects described herein may be combined with each other, unless noted otherwise.

Figure 1:
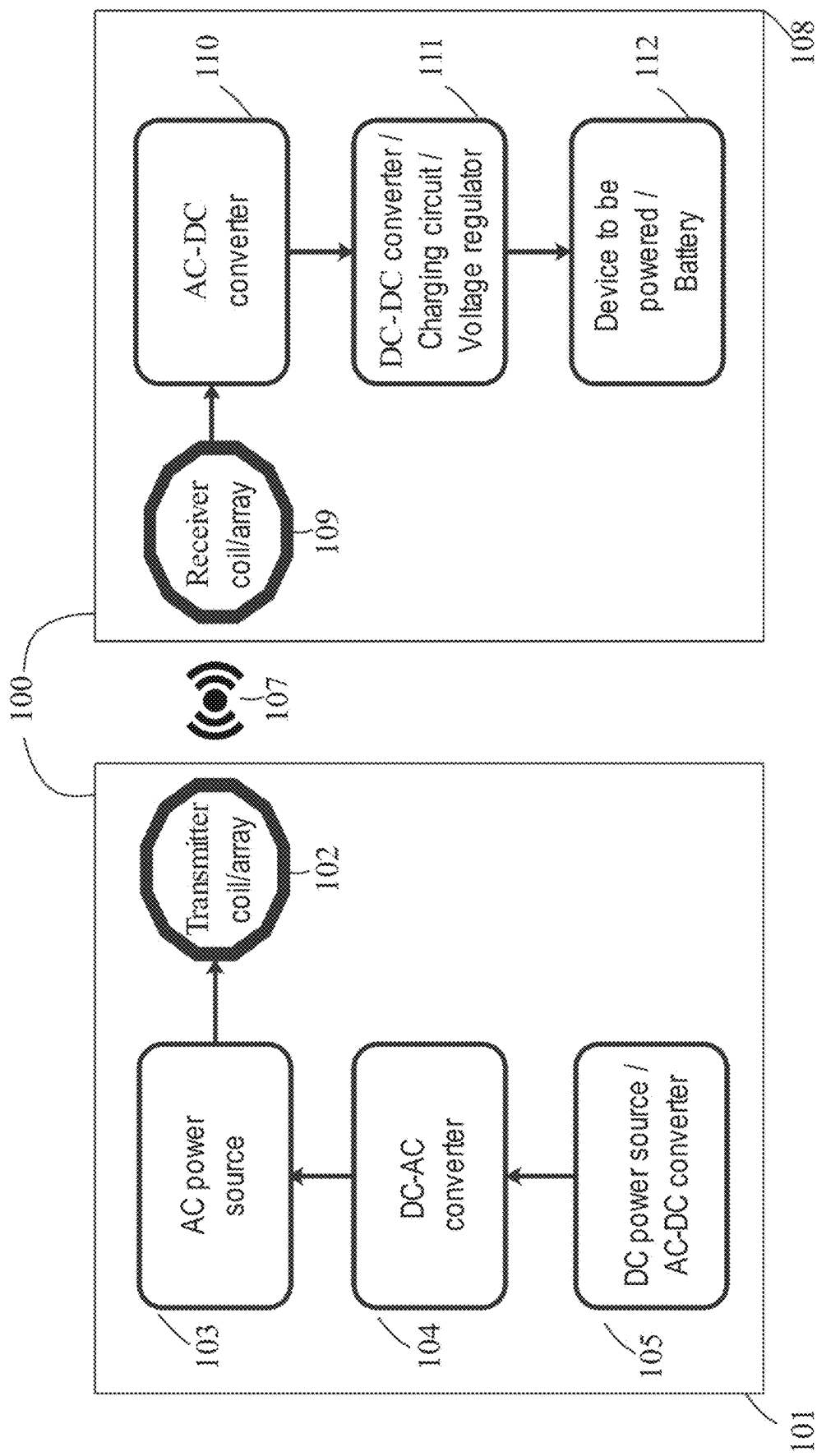
FIG. 1 shows a schematic diagram illustrating a wireless power transfer system 100 according to the disclosure.

FIG. 1 shows a schematic diagram illustrating a wireless power transfer system 100 according to the disclosure.

The wireless power transfer systems 100 of the disclosed technology are composed by a transmitter device 101 and a receiver device 108. The transmitter device may have a single coil or an arrangement of coils 102 acting as the inductive element(s) of an inductive-capacitive resonator that when electrically to a time-varying voltage or current source(s) produces a time varying electromagnetic field 107 that in turn causes a circulating electric field through a receiver device 108 or a plurality of receiver devices using the principle of electromagnetic induction.

Supplying energy to the resonators of the transmitter device may comprise injecting current to each transmitter coil via a direct electrical connection to the alternating current (AC) power source 103 at a certain excitation frequency close to a nominal resonant frequency of each of the electrical resonators and/or exciting a circulating electric field in the resonators inductively, such as resonance and/or inductive power transfer.

In some implementations, the AC power source 103 of the transmitter device 101 may be connected to the output of a direct current (DC) to AC converter 104, in order to extract the required power for its function from a DC power source 105, such as a battery in the transmitter device. In some other implementations the transmitter device may also have the possibility to extract the required power for its function from an AC-DC converter 105, such as a circuit that converts the AC power of the line into a DC power.

The receiver device 108 may have a single coil or an arrangement of coils 109 acting as the inductive element(s) of an inductive-capacitive resonator(s). In some implementations, the receiver device 108 may be connected to an AC-DC converter 110, for example a rectifier that converts the alternating current (AC) to a direct current (DC) if the device to be powered by the specific application requires DC, such as the case of delivering DC power to an electronic device. In some other implementations, there may be a circuit 111 to convert a DC power level to another DC power level, such as a DC-DC converter or a charging circuit used to regulate the power delivered to the battery of the electronic device that is being supplied to or even a voltage regulator that ensures that a certain voltage level at the input of the electronic device.

Figure 2A:
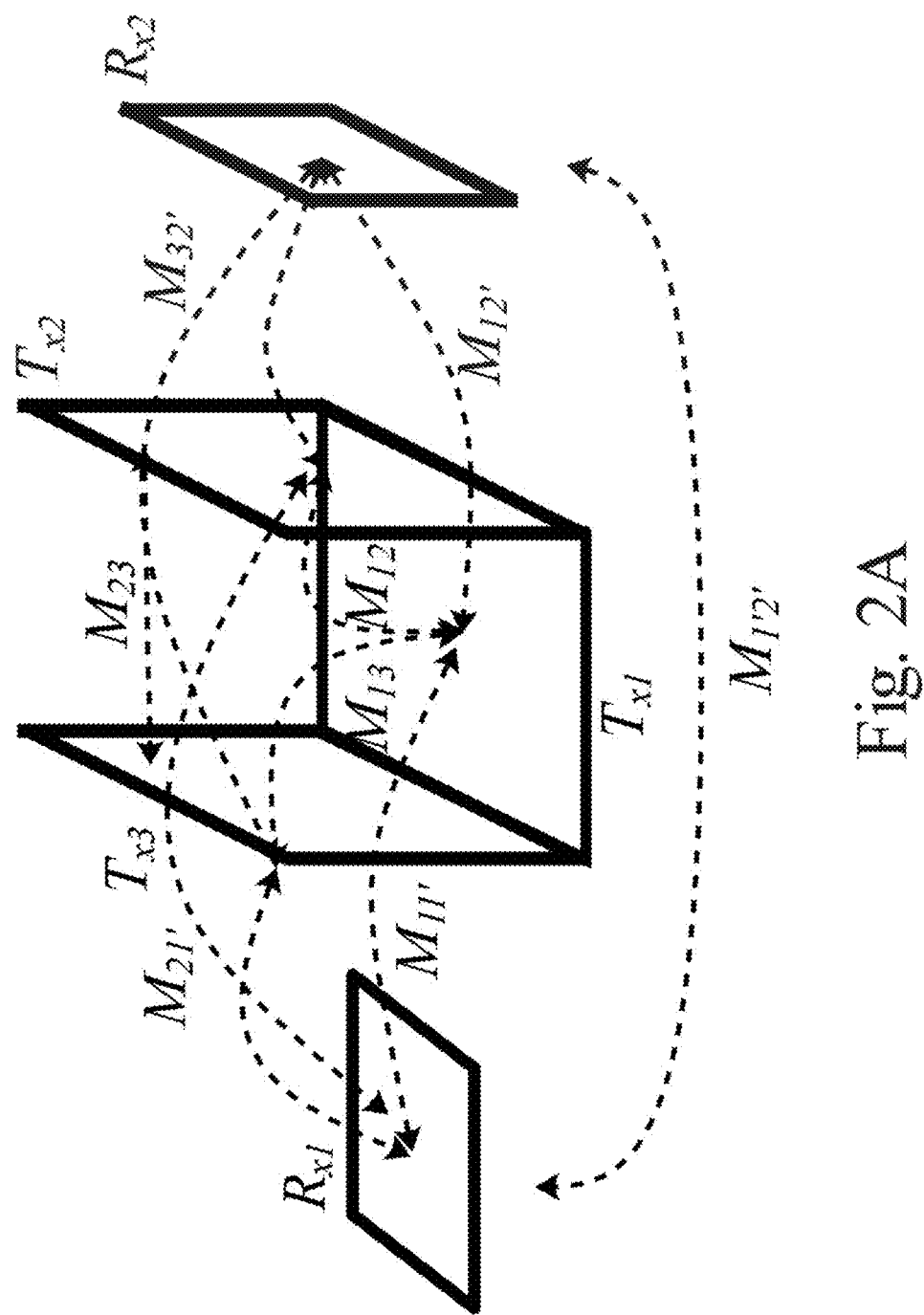
FIG. 2A shows a schematic diagram illustrating an wireless power transfer system composed of three transmitter resonators and two receiver resonators according to an example.
Figure 2B:
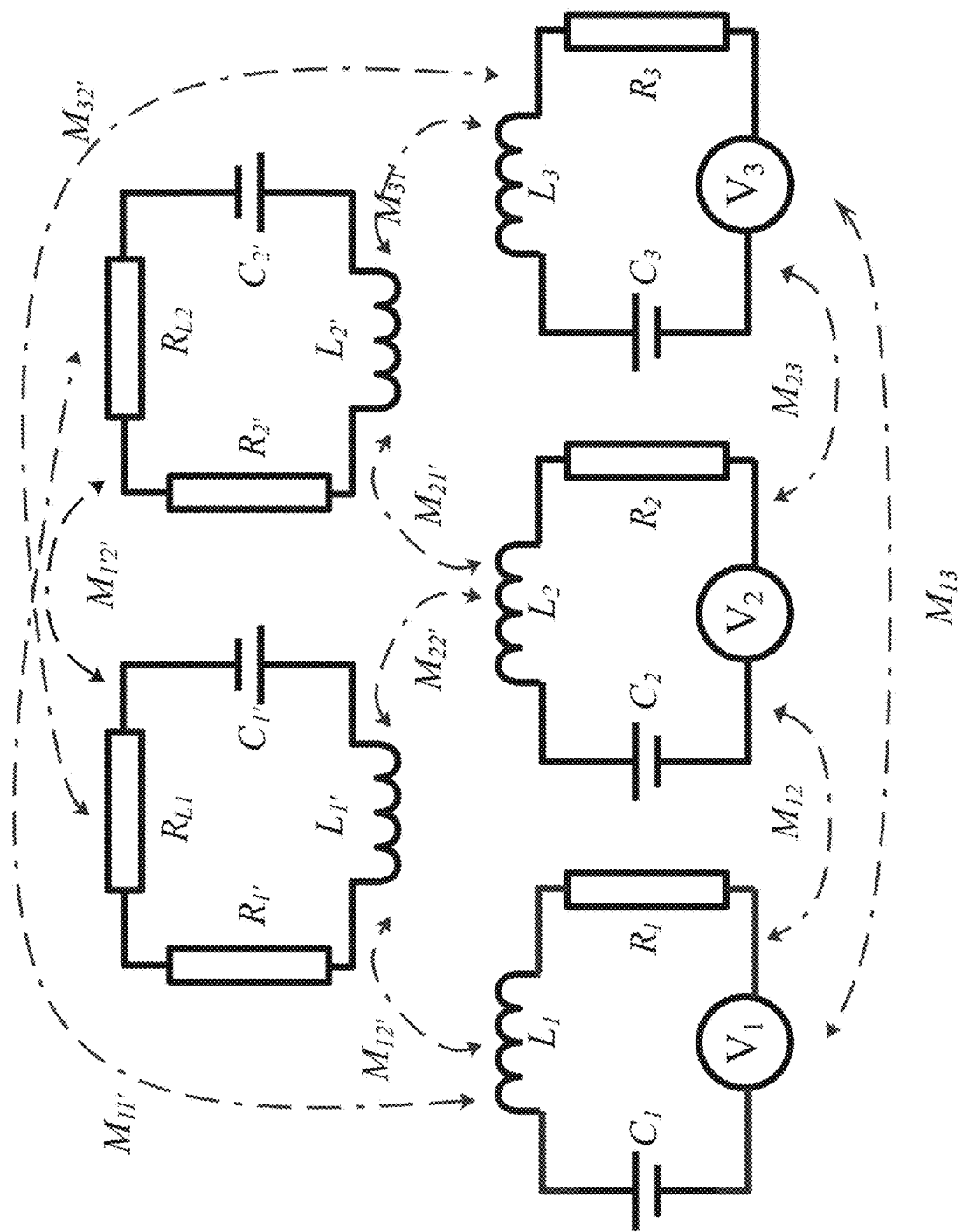
FIG. 2B shows a circuit diagram of the wireless power transfer system of FIG. 2A.

FIG. 2A shows a schematic diagram illustrating a wireless power transfer system composed of three transmitter resonators and two receiver resonators according to an example and FIG. 2B shows a circuit diagram of the wireless power transfer system of FIG. 2A.

In particular, FIG. 2, i.e. FIGS. 2A and 2B, shows a wireless power transfer system composed of three transmitter resonators $T_{x1}$, $T_{x1}$ and $T_{x3}$ and two receiver resonators $R_{x1}$ and $R_{x2}$. Although each resonator is depicted as a simple square geometry, each diagram can also represent any other more complicated geometry like the geometries 200 disclosed herein. What is of particular interest in this wireless power transfer system is the complicated interaction between the electromagnetic couplings among all resonators in the system. As seen from FIG. 2A, each transmitter is not only coupled to each receiver, but there is coupling between transmitters and receivers. This characteristic is inherent to this specific diagram and it cannot be present in another arrangement. However, the same analysis procedure is applicable regardless the number of electromagnetic couplings between the resonators of the system.

To find the efficiency of a complicated system with an increased number of coupling orders, one can use the inversion of the impedance matrix and its relation to the voltages and currents across and through the resonators composing the system. The impedances of the system in FIG. 2, or even one with more cells (N) and more entangled interactions between the cells composing it, and the receiver(s) can be described with the impedance matrix as $$Z = \begin{bmatrix} Z_{11} & Z_{12} & Z_{13} & \cdots & Z_{1N} & Z_{11'} & Z_{12'} \\ Z_{21} & Z_{22} & Z_{23} & \cdots & Z_{2N} & Z_{21'} & Z_{22'} \\ \vdots & \vdots & \vdots & \ddots & \vdots & \vdots & \vdots \\ Z_{N1} & Z_{N2} & Z_{N3} & \cdots & Z_{NN} & Z_{N1'} & Z_{N2'} \\ Z_{1'1} & Z_{1'2} & Z_{1'3} & \cdots & Z_{1'N} & Z_{1'1'} & Z_{1'2'} \\ Z_{2'1} & Z_{2'2} & Z_{2'3} & \cdots & Z_{2'N} & Z_{2'1'} & Z_{2'2'} \end{bmatrix} = \begin{bmatrix} Z+R_s & j\omega M_{12} & j\omega M_{13} & \cdots & j\omega M_{1N} & j\omega M_{11'} & j\omega M_{12'} \\ j\omega M_{21} & Z+R_s & j\omega M_{23} & \cdots & j\omega M_{2N} & j\omega M_{21'} & j\omega M_{22'} \\ \vdots & \vdots & \vdots & \ddots & \vdots & \vdots & \vdots \\ j\omega M_{N1} & j\omega M_{N2} & j\omega M_{N3} & \cdots & j\omega M_{NN} & j\omega M_{N1'} & j\omega M_{N2'} \\ j\omega M_{1'1} & j\omega M_{1'2} & j\omega M_{1'3} & \cdots & j\omega M_{1'N} & Z_{1'}+R_{L1} & j\omega M_{1'2'} \\ j\omega M_{2'1} & j\omega M_{2'2} & j\omega M_{2'3} & \cdots & j\omega M_{2'N} & j\omega M_{2'1'} & Z_{2'}+R_{L2} \end{bmatrix} \quad (1)$$

The first representation of the impedance matrix shows the impedances of the resonators as $Z_{ij}$ where the subscripts, i and j, correspond to the row and column numbers. Note that the system is assumed to have N cells represented by the matrix elements $Z_{11}$ to $Z_{NN}$, without considering all the elements in the last two rows and columns which indicate how the receivers, $Z_{1'1'}$ and $Z_{2'2'}$ are coupled to each transmitter of the system, as well as between them. As observed in the second representation of the impedance matrix, the impedances of the elements in the diagonal correspond to each cell's impedance considering any impedance that has been connected to it. For instance, each transmitter resonator of the system is composed by its self-impedance, $Z=R_N+j\omega L_N+1/(j\omega C_N)$, plus the impedance of the power supply, $R_S$ connected in series, as depicted in FIG. 2B.

Note as well that the elements corresponding to the receivers have a load resistance, $R_L$ included. The elements in the second diagonal correspond to the first coupling order between the resonators of the device, and the elements of the third diagonal represent the second coupling order between the resonators. If in a certain wireless power transfer system only the first order of the magnetic coupling matters, equation (1) becomes a tridiagonal matrix, if the second coupling order is also important, equation (1) becomes a pentadiagonal matrix. Note that the coupling between the receiver and the cells of the device has been maintained with a general notation ($Z_{N'N}$), where N represents the transmitter number of the system and N' the considered receiver. With the help of a numeric inversion software one can, for example, use the following equation $$\begin{bmatrix} V_1 \\ V_2 \\ \vdots \\ V_N \\ V_{1'} \\ V_{2'} \end{bmatrix} = \begin{bmatrix} Z_{11} & Z_{12} & Z_{13} & \cdots & Z_{1N} & Z_{11'} & Z_{12'} \\ Z_{21} & Z_{22} & Z_{23} & \cdots & Z_{2N} & Z_{21'} & Z_{22'} \\ \vdots & \vdots & \vdots & \ddots & \vdots & \vdots & \vdots \\ Z_{N1} & Z_{N2} & Z_{N3} & \cdots & Z_{NN} & Z_{N1'} & Z_{N2'} \\ Z_{1'1} & Z_{1'2} & Z_{1'3} & \cdots & Z_{1'N} & Z_{1'1'} & Z_{1'2'} \\ Z_{2'1} & Z_{2'2} & Z_{2'3} & \cdots & Z_{2'N} & Z_{2'1'} & Z_{2'2'} \end{bmatrix} \begin{bmatrix} I_1 \\ I_2 \\ \vdots \\ I_N \\ I_{1'} \\ I_{2'} \end{bmatrix}, \quad (2)$$

in which, according to FIG. 2B, the current vector must be found. The voltage vector refers to any external excitation applied to the system. All the transmitter coils of the system in FIG. 2B are excited, consequently $V_N=V_s$. The unknown vector in (2) can then be found with the matrix operation $$I=Z^{-1}V. \quad (3)$$

Once the current vector is known, any wireless power transfer system is completely defined. Therefore, one can express the system efficiency as $$\eta = 100\frac{P_{out}}{P_{in}} = 100\frac{\mathbb{R}(Z_{1'1'})|I_{1'}^2| + \mathbb{R}(Z_{2'2'})|I_{2'}^2|}{\mathbb{R}(Z_{inp_1})|I_1^2| + \mathbb{R}(Z_{inp_2})|I_2^2| + \ldots + \mathbb{R}(Z_{inp_N})|I_N^2|} \quad (4)$$

where $Z_{inp_N}=V_N/I_N-R_s$ is the input impedance of the system presented to the power supply and $I_N$ and $I_{1'}$ are the currents circulating through the transmitter N and one of the receivers, respectively. The amount of output power provided to the receiver(s) will be a function of their position in space and the operating frequency as parameters such as the impedance of the cells are a function of frequency.

Note that to be able to solve equation (1), the coils' electrical parameters like its inductance, resistance and capacitance must be known for the desired operating frequency, as well as, the mutual inductance between any pair of coils, $M_{12}$, $M_{13}$, $M_{23}$, $M_{11'}$, $M_{12'}$, $M_{21'}$, $M_{22'}$, $M_{31'}$, and $M_{32'}$. To find these parameters, one can turn to data obtained analytically, or by using finite element method simulation software or direct measurements.

Figure 3B:
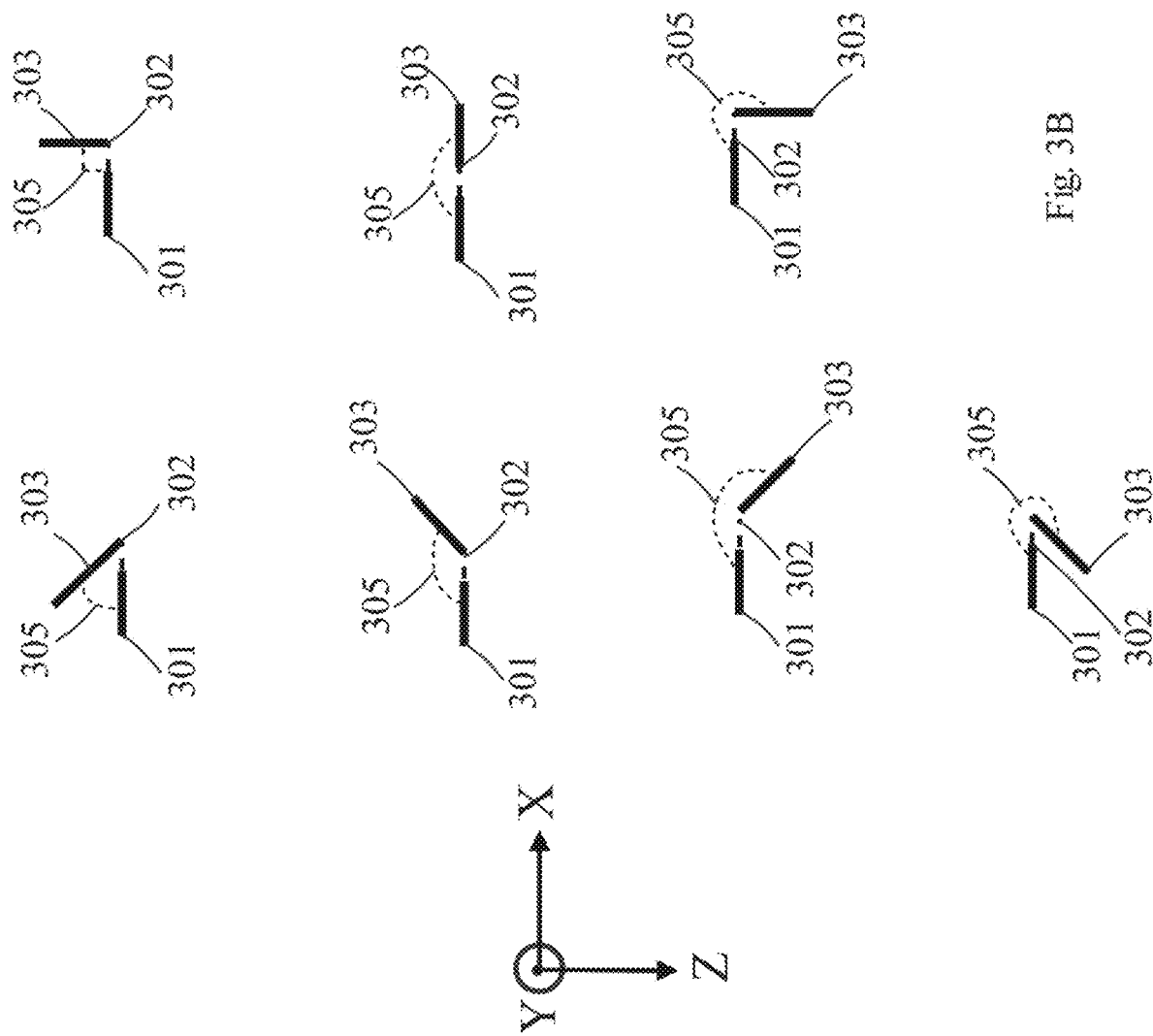
FIG. 3B shows a schematic diagram illustrating examples of different coil geometries.
Figure 3C:
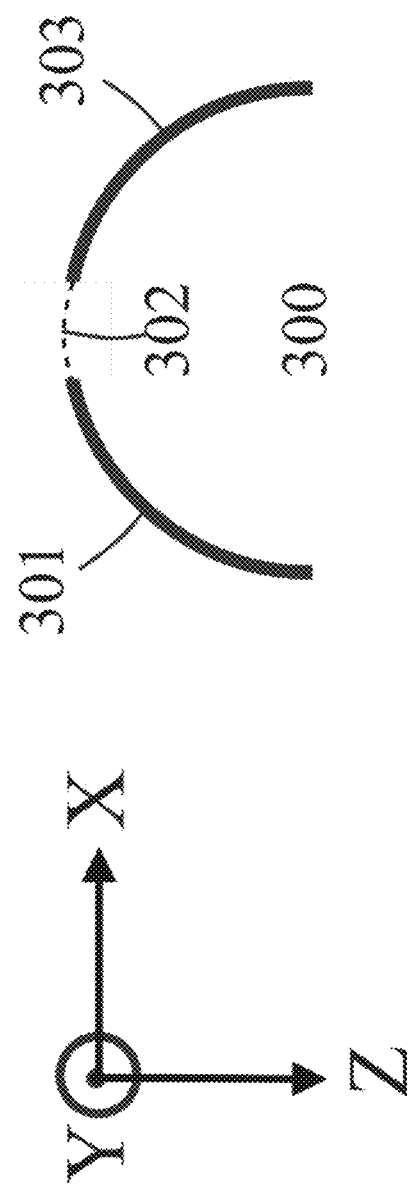
FIG. 3C shows a schematic diagram illustrating another example of coil geometries.

FIG. 3A shows a schematic diagram illustrating a composed coil geometry 300 according to the disclosure. FIG. 3B shows a schematic diagram illustrating examples of different coil geometries. FIG. 3C shows a schematic diagram illustrating another example of coil geometries.

The coil or coils 300 of the transmitter device of the disclosed technology are implemented by composed coil geometries as the one exemplified by FIG. 3A. The coil 300 is composed of at least two individual spiral coils 301 & 303. The composed coil geometry is formed by the electrical connections 302 and 304 which can be satisfied in the following ways:

(i)—Connection 302 or connection 304 may join the two individual spirals by a material of the same or different conductivity as the material(s) used in the coils 301 and 303, while the other two remaining ports, from connection 304 or connection 302, respectively, may be connected to an capacitor or capacitor network 305 whose equivalent capacitance is used to create an electrical resonator at a certain resonance frequency in conjunction with the self-inductance of the composed coil. This electrical resonator can be then connected in series or in parallel to the AC source.

(ii)—Connection 302 or connection 304 may join the two individual spirals by a material of the same or different conductivity as the material(s) used in the coils 301 and 303, while the other two remaining ports, from connection 304 or connection 302, respectively, may be connected in series or parallel to the AC source. In order to create a series electrical resonator in this case, any of the individual spiral coils may have its turns segmented and the equivalent capacitance of capacitor or capacitor network can be connected in series to each of the ends of this segmentation.

(iii)—Connection 302 or connection 304 may join the two individual spirals by an impedance or impedance network in order to modify the overall impedance of the composed coil, while the other two remaining ports, from connection 304 or connection 302, respectively, may be connected to an capacitor or capacitor network whose equivalent capacitance is used to create an electrical resonator at a certain resonance frequency in conjunction with the self-inductance of the composed coil. This electrical resonator can be then connected in series or in parallel to the AC source.

(iv)—Connection 302 or connection 304 may join the two individual spirals with a direct connection to a capacitor or capacitor network whose equivalent capacitance is used to create an electrical resonator at a certain resonance frequency in conjunction with the self-inductance of the composed coil. While the other two remaining ports, from connection 304 or connection 302, respectively, can be then connected in series or in parallel to the AC source.

(v)—Connection 302 or connection 304 may join the two individual spirals with a direct connection to a capacitor or capacitor network whose equivalent capacitance is used to create an electrical resonator at a certain resonance frequency in conjunction with the self-inductance of the composed coil. While the other two remaining ports, from connection 304 or connection 302, respectively, may be then connected in series or in parallel to the AC source. An extra impedance or impedance network may be introduced in the series or parallel circuit formed by the composed coil, the capacitor or capacitor network and the AC source either in series or parallel in order to modify the overall impedance of the electrical resonator.

(vi)—Connection 302 or connection 304 may join the two individual spirals with a direct connection to the AC source. While the other two remaining ports, from connection 304 or connection 302, respectively, may be then connected in series or in parallel to a capacitor or capacitor network whose equivalent capacitance is used to create an electrical resonator at a certain resonance frequency in conjunction with the self-inductance of the composed coil. An extra impedance or impedance network may be introduced in the series or parallel circuit formed by the composed coil, the capacitor or capacitor network and the AC source either in series or parallel in order to modify the overall impedance of the electrical resonator.

In some implementations of the disclosed technology, the composed coil 300 may have the two individual spiral coils lying next to each other with the same height, as exemplified by FIG. 3A or the individual spiral coils may be located at a different height. In other implementations, the individual spiral coils can be folded at any angle >0 or <360 degrees with respect to one another, as exemplified by FIG. 3B. In further implementations the composed coils can be bent with a certain radius of curvature as shown in FIG. 3C.

Although the coil in FIG. 3A is composed by individual square spirals, the coils can also be composed by circular or polygonal shapes, such as triangular, square, rectangular, pentagonal, hexagonal, etc. Each one of the individual spirals of the composed coils may have a different shape. An arrangement of composed coils may combine coils with different shapes. The winding direction of each individual spiral of the composed coil may be different.

The composed coils may have a substrate/core of a material either with a high permeability, magnetic or composite magnetic core, or with a low permeability, e.g. a dielectric substrate like glass-reinforced epoxy laminate material (FR4).

In order for the composed coils to retain the folded or bended shape of FIG. 3B or 3C they may be mechanically attached to a flexible carrier substrate (e.g. Thin FR4, polyimide, thin polymer, etc.). In the case of the composed coils of FIG. 3B, each individual spiral can be mechanically attached to a rigid substrate and use the connections 302 and 304 as the elements, with respect to which, the fold at a certain angle is performed. The composed coils can also retain a defined fold or bend without the use of a carrier substrate if the fabrication method allows them to stand free, for example, the coils are made with mechanically malleable conductive material, like a hollow metal pipe or the conductive material is coated with a self-bonding polymer that after the application of heat, for example, it melts and after the heat is removed, the polymer stiffens around the conductive material that make the turns of the composed coils. 3D printing technology to print a conductive material can also be used to produce the composed coils of FIG. 3.

With respect to the configurations illustrated in FIGS. 3A, 3B and 3C, a wireless power transmitter device 101 according to the disclosure and a wireless power receiver device 101 according to the disclosure is described hereinafter.

The wireless power transmitter device 101 comprises at least one transmitter coil 102 acting as inductive element of at least one inductive-capacitive resonator that upon excitation with a time-varying voltage produces a time varying electromagnetic field 107 causing a circulating electric field through at least one receiver coil of a wireless power receiver device 108 for charging the wireless power receiver device 108. The at least one transmitter coil 102, 300 is composed of at least two spirals 301, 303 electrically connected 302, 304 to each other, wherein the at least two spirals 301, 303 are oriented in space to form a composed geometric figure as illustrated in FIG. 3A.

The at least two spirals 301, 303 may be symmetrically positioned in space towards a common reference point or axis, e.g. as illustrated in FIG. 3A.

The at least two spirals 301, 303 may be folded or bent with respect to one another or may be located next to each other with the same height or at a different height.

The at least one transmitter coil 102, 300 may comprise: a first port formed by a first wire end of a first spiral 301 of the at least two spirals 301, 303; a second port formed by a first wire end of a second spiral 303 of the at least two spirals 301, 303; a third port formed by a second wire end of the first spiral 301 of the at least two spirals 301, 303; and a fourth port formed by a second wire end of the second spiral 303 of the at least two spirals 301, 303, e.g. as illustrated in FIG. 3A.

The at least one transmitter coil 102, 300 may comprise: a first electrical connection 302 electrically connecting one of the two ports of the first spiral 301 with one of the two ports of the second spiral 303; a second electrical connection 302 electrically connecting the other port of the two ports of the first spiral 301 with the other port of the two ports of the second spiral 303, e.g. as illustrated in FIG. 3A.

The first electrical connection 302 may join the first spiral 301 with the second spiral 303 by a material of the same or a different conductivity than a material of the spirals 301, 303.

The second electrical connection 304 may connect the first spiral 301 and the second spiral 303 to a capacitor or capacitor network, wherein an equivalent capacitance of the capacitor or capacitor network is used to create an electrical resonator at a resonance frequency in conjunction with a self-inductance of the at least one transmitter coil 102, 300, wherein the electrical resonator is driven by an AC source 103, e.g. as illustrated in FIG. 1.

At least one of the first spiral 301 and the second spiral 303 may have segmented turns; and the equivalent capacitance of the capacitor or capacitor network may be connected to segments of the segmented turns of the at least one of the first spiral 301 and the second spiral 303.

The first electrical connection 302 may join the first spiral 301 and the second spiral 303 by an impedance or impedance network in order to modify an overall impedance of the at least one transmitter coil 102, 300.

The at least two spirals 301, 303 may have a circular, elliptical or polygonal shape, in particular triangular, square, rectangular, pentagonal or hexagonal.

Each of the at least two spirals 301, 303 may have the same or a different shape.

Each of the at least two spirals 301, 303 may have the same or a different winding direction.

Each of the at least two spirals 301, 303 may be composed of a high permeability magnetic or composite magnetic core material or of a low permeability dielectric core material, in particular glass-reinforced epoxy laminate material, FR4.

The at least two spirals 301, 303 may be mechanically attached to a flexible carrier substrate, in particular FR4, polyimide, polymer, to retain their folded or bended shape.

In one example, e.g. as shown in FIG. 4, the wireless power transmitter device 101, 400 may comprise at least two transmitter coils 300, wherein a first transmitter coil 300 of the at least two transmitter coils faces a second transmitter coil 300 of the at least two transmitter coils under a folding angle 305 of about 90 degrees, wherein the first and the second transmitter coils 300 are positioned at the same or different height with respect to each other.

In one example, e.g. as shown in FIG. 5, the wireless power transmitter device 101, 500 may further comprise a single-spiral coil 501 that is located on top of the first and the second transmitter coils 300.

In one example, e.g. as shown in FIG. 6, the wireless power transmitter device 101, 600 may comprise four transmitter coils 300, each transmitter coil 300 composed of a first 301 and a second 303 spiral arranged with respect to each other under a folding angle of about 90 degrees, wherein all four transmitter coils 300 are arranged with respect to each other under a folding angle 305 of about 90 degrees, wherein each first spiral 301 of a transmitter coil 300 of the four transmitter coils overlaps with a second spiral 303 of another transmitter coil 300 of the four transmitter coils located next to the transmitter coil.

In one example, e.g. as shown in FIG. 7, the wireless power transmitter device 101, 700 may comprise three transmitter coils 300, each transmitter coil 300 composed of a first 301 and a second 303 spiral arranged with respect to each other under a folding angle of about 60 degrees, wherein all three transmitter coils 300 are arranged with respect to each other under a folding angle (305) of about 60 degrees, wherein each first spiral 301 of a transmitter coil 300 of the three transmitter coils overlaps with a second spiral 303 of another transmitter coil 300 of the three transmitter coils located next to the transmitter coil.

In one example, e.g. as shown in FIG. 8, the wireless power transmitter device 101, 800 may comprise four transmitter coils 300, each transmitter coil 300 composed of a first 301 and a second 303 spiral arranged with respect to each other under a folding angle of about 90 degrees, wherein all four transmitter coils 300 are arranged with respect to each other under a folding angle 305 of about 90 degrees, wherein the first spirals 301 of the four transmitter coils 300 are arranged in a first plane, wherein the second spirals of two transmitter coils of the four transmitter coils are arranged in a second plane perpendicular to the first plane, and wherein the second spirals of the other two transmitter coils of the four transmitter coils are arranged in a third plane perpendicular to both the first and the second plane.

In one example, e.g. as shown in FIG. 9, the wireless power transmitter device 101, 900 may comprise two transmitter coils 300, each transmitter coil 300 composed of a first 301 and a second 303 spiral which are bent with respect to each other under a radius of curvature, wherein the two transmitter coils 300 are bent with respect to each other under a radius of curvature.

In one example, e.g. as shown in FIG. 10, the wireless power transmitter device 101, 600 may comprise an arrangement of at least two transmitter coils 102, wherein the arrangement of at least two transmitter coils 102 has a cuboid 400, spherical 1000 or semi-planar 1003 shape.

In one example, e.g. as shown in FIG. 11, the wireless power transmitter device 101, 400, 700 is also acting as a wireless power receiver device, that upon receiving a time varying electromagnetic field 107 produces a corresponding time-varying voltage at the at least one transmitter coil 102.

In one example, e.g. as shown in FIG. 11, the wireless power transmitter device 101, 400, 700 is acting both as a wireless power transmitter device and as a wireless power receiver device, to implement a wireless power relay for wireless power transmission from another wireless power transmitter device to another wireless power receiver device.

Figure 12:
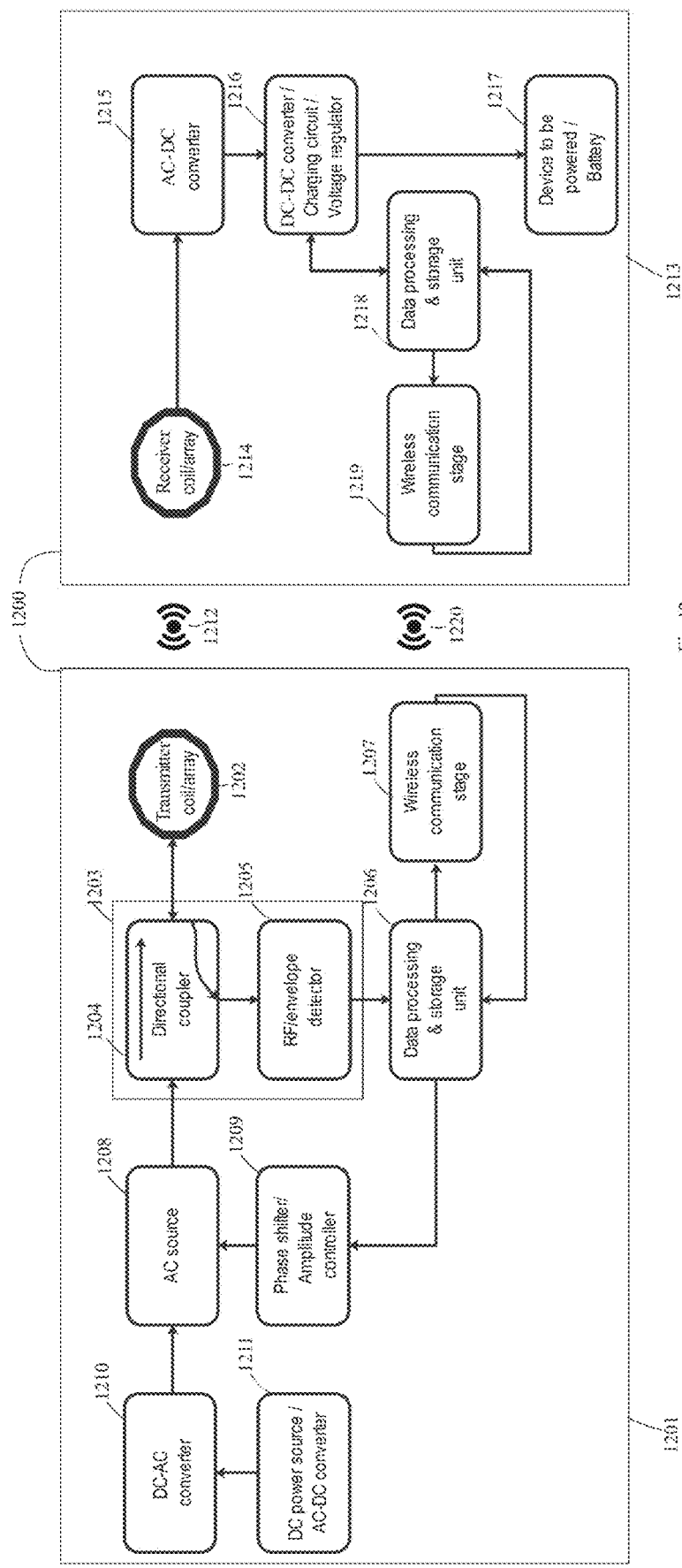
FIG. 12 shows a schematic diagram illustrating an wireless power transfer system 1200 according to an example.
Figure 13:
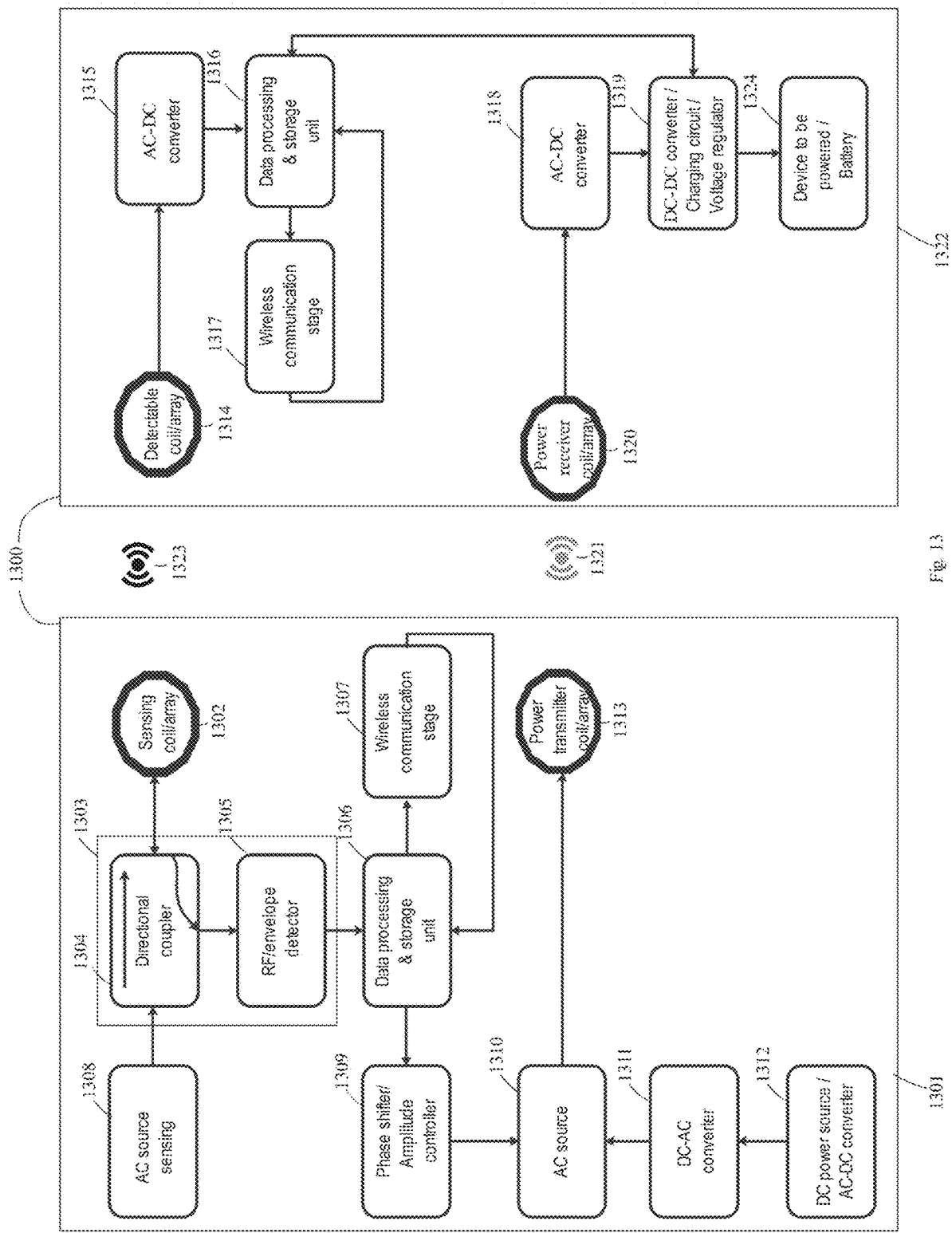
FIG. 13 shows a schematic diagram illustrating an wireless power transfer system 1300 according to an example.

In one example, e.g. as shown in FIG. 12 or 13, the wireless power transmitter device 101, 400, 700, 1201, 1301 may comprise: at least one AC power source 1208, 1310 providing the time-varying voltage for excitation of the at least one inductive-capacitive resonator of the at least one transmitter coil 102; and a phase and amplitude controller 1209, 1309 configured to control at least one of a magnitude or a phase of the at least one AC power source 1208, 1310 based on a sensing signal indicating a location of the wireless power receiver device 108, 1213, 1322.

In one example, e.g. as shown in FIG. 12, the wireless power transmitter device 101, 400, 700, 1201 may comprise: a power detection unit 1203, configured to detect a change in an electromagnetic coupling 1212 of the at least one inductive-capacitive resonator of the at least one transmitter coil 102, 1202 with a corresponding resonator 1214 of the wireless power receiver device 108, 1213, wherein the power detection unit 1203 is configured to provide the sensing signal based on the detected change in the electromagnetic coupling 1212 of the at least one inductive-capacitive resonator of the at least one transmitter coil 102, 1202.

In one example, e.g. as shown in FIG. 13, the wireless power transmitter device 101, 400, 700, 1301 may comprise: a power detection unit 1303, configured to detect a change in an electromagnetic coupling 1323 of at least one inductive-capacitive resonator of a sensing coil 1302 with a corresponding resonator 1314 of the wireless power receiver device 108, 1213, wherein the at least one inductive-capacitive resonator of the sensing coil 1302 is configured to operate at another operating frequency than the at least one inductive-capacitive resonator of the at least one transmitter coil 102, 1202, wherein the power detection unit 1303 is configured to provide the sensing signal based on the detected change in the electromagnetic coupling 1323 of the at least one inductive-capacitive resonator of the sensing coil 1302.

In one example, e.g. as shown in FIG. 12 or 13, the wireless power transmitter device 101, 400, 700, 1201, 1301 may comprise a data processing and storage unit 1206 configured to: sample and process an analogue voltage output of the power detection unit 1203, 1303 that includes the sensing signal, and set operation characteristics of the phase and amplitude controller 1209, 1309 based on the sensing signal.

In one example, e.g. as shown in FIG. 12 or 13, the wireless power transmitter device 101, 400, 700, 1201, 1301 may comprise a wireless communication stage 1207, 1307 configured to: wireless communicate with a corresponding wireless communication stage 1219, 1317 of the wireless power receiver device 108, 1213, 1322, and set the operation characteristics of the phase and amplitude controller 1209, 1309 based on the wireless communication with the wireless power receiver device 108, 1213, 1322.

A wireless power receiver device 108, e.g. as shown in FIGS. 1 and 3A comprises: at least one receiver coil 109 acting as inductive element of at least one inductive-capacitive resonator that upon receiving a time varying electromagnetic field 107 from at least one corresponding inductive-capacitive resonator of a wireless power transmitter device produces a time-varying voltage at the at least one receiver coil for charging the wireless power receiver device 108, wherein the at least one receiver coil 109, 300 is composed of at least two spirals 301, 303 electrically connected 302, 304 to each other, wherein the at least two spirals 301, 303 are oriented in space to form a composed geometric figure.

The at least two spirals 301, 303 may be symmetrically positioned in space towards a common reference point or axis, e.g. as shown in FIG. 3A.

The at least two spirals 301, 303 may be folded or bent with respect to one another or are located next to each other with the same height or at a different height.

Figure 4A:
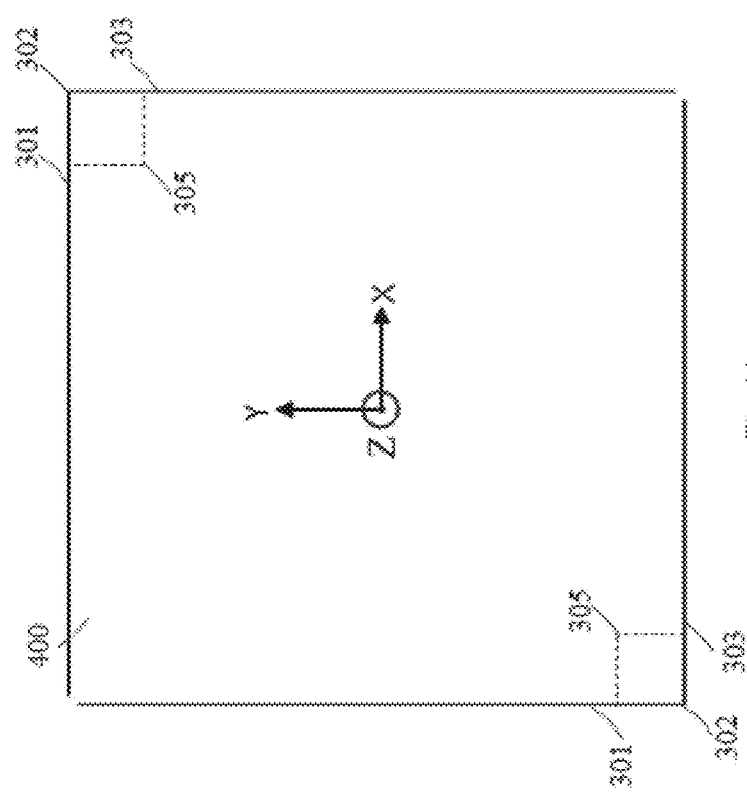
FIG. 4A shows a schematic diagram illustrating inductive elements of a wireless power transmitter arrangement 400 composed by two composed coils 300 according to an example.
Figure 4B:
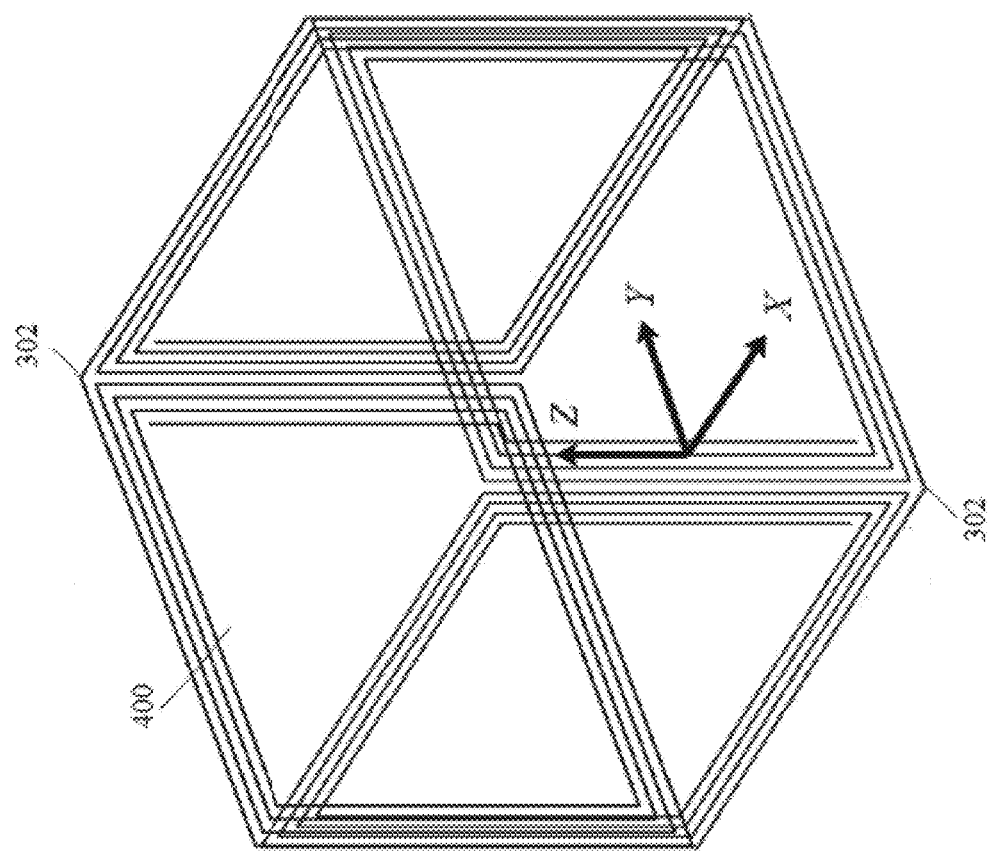
FIG. 4B shows a 3-dimensional representation of the wireless power transmitter arrangement 400 of FIG. 4A.

In one example, e.g. as shown in FIGS. 4A and 4B, the wireless power receiver device 108, 400 may comprise at least two receiver coils 300, wherein a first receiver coil 300 of the at least two receiver coils faces a second receiver coil 300 of the at least two receiver coils under a folding angle 305 of about 90 degrees, wherein the first and the second receiver coils 300 are positioned at the same or different height with respect to each other.

Figure 5B:
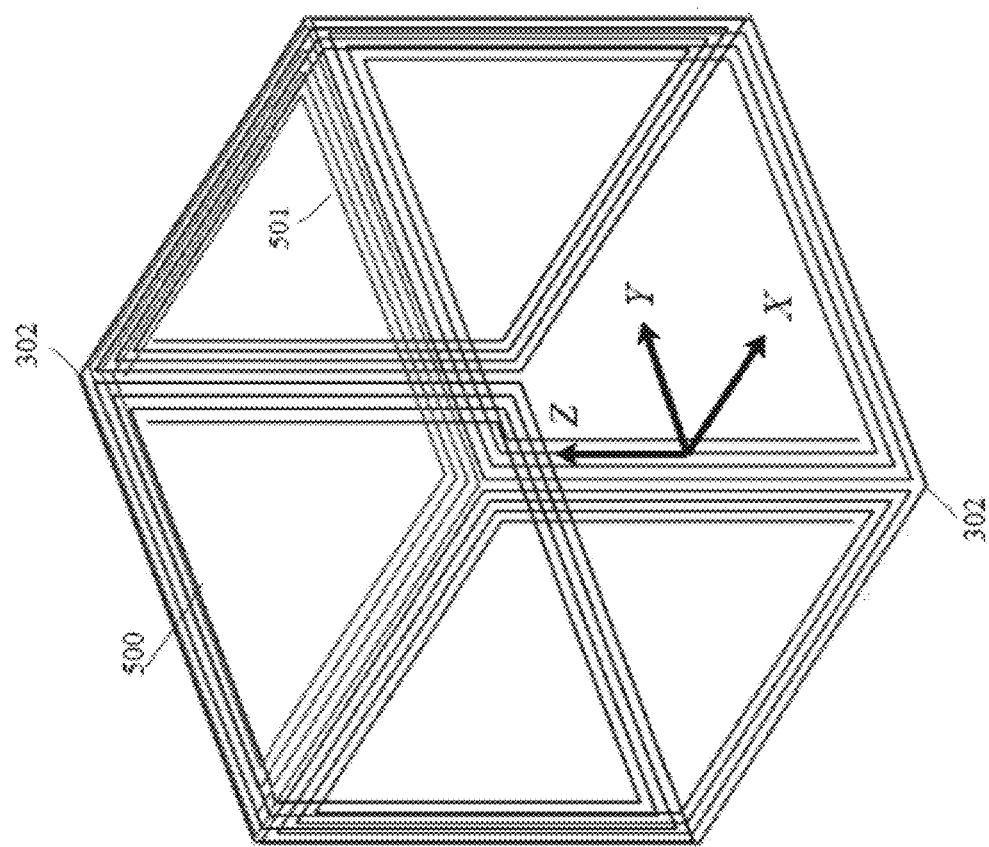
FIG. 5B shows a 3-dimensional representation of the wireless power transmitter arrangement 500 of FIG. 5A.
Figure 5A:
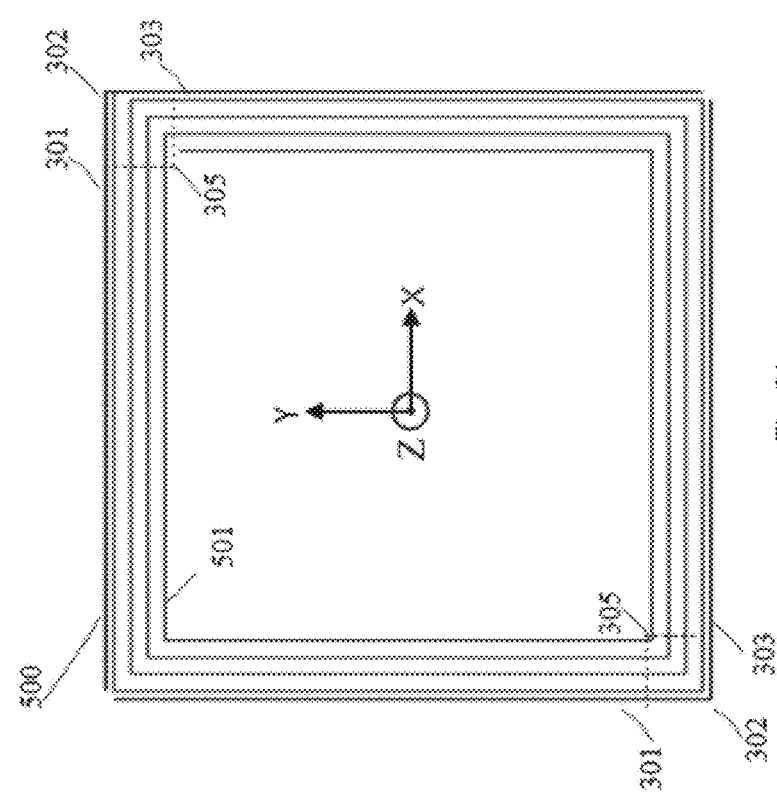
FIG. 5A shows a schematic diagram illustrating inductive elements of a wireless power transmitter arrangement 500 composed by two composed coils 300 and one additional single-spiral coil according to an example.

In one example, e.g. as shown in FIGS. 5A and 5B, the wireless power receiver device 108, 500 may further comprise: an additional single-spiral coil that is located on top of the first and the second receiver coils 300.

In one example, e.g. as shown in FIGS. 6A and 6B, the wireless power receiver device 108, 600 may comprise four receiver coils 300, each receiver coil 300 composed of a first 301 and a second 303 spiral arranged with respect to each other under a folding angle of about 90 degrees, wherein all four receiver coils 300 are arranged with respect to each other under a folding angle 305 of about 90 degrees, wherein each first spiral 301 of a receiver coil 300 of the four receiver coils overlaps with a second spiral 303 of another receiver coil 300 of the four receiver coils located next to the receiver coil.

Figure 7B:
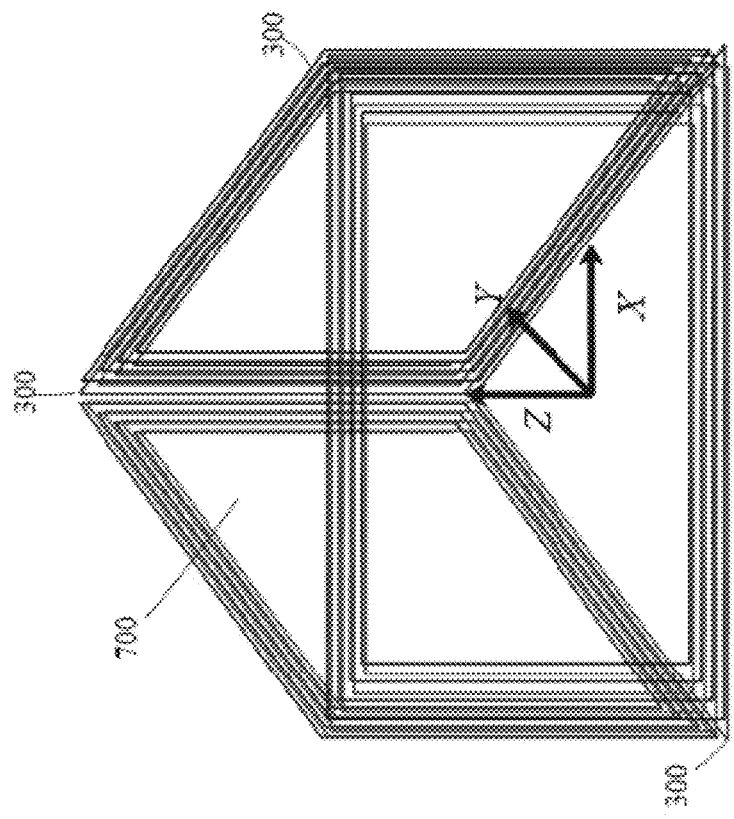
FIG. 7B shows a 3-dimensional representation of the wireless power transmitter arrangement 700 of FIG. 7A.
Figure 7A:
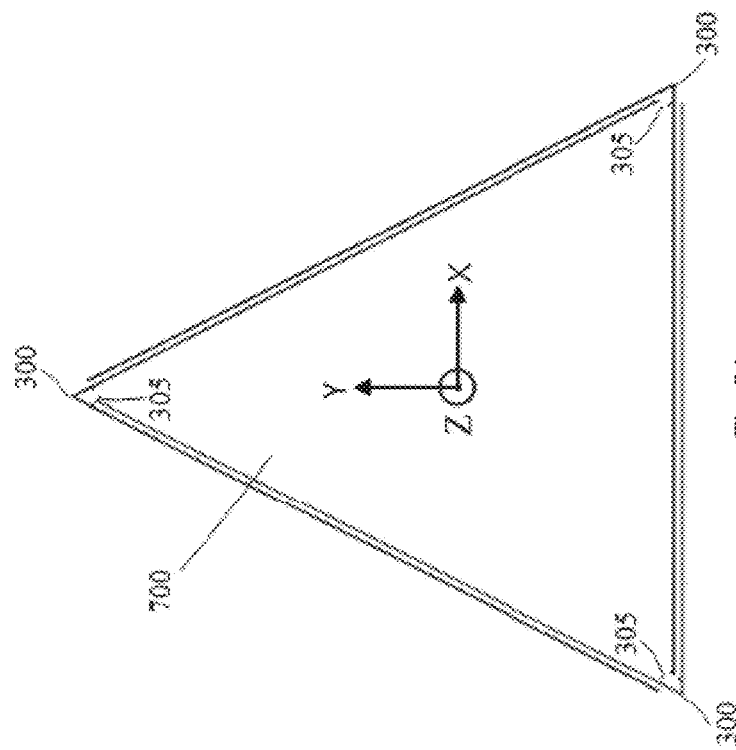
FIG. 7A shows a schematic diagram illustrating inductive elements of a wireless power transmitter arrangement 700 composed by three composed coils 300 according to an example.

In one example, e.g. as shown in FIGS. 7A and 7B, the wireless power receiver device 108, 700 may comprise three receiver coils 300, each receiver coil 300 composed of a first 301 and a second 303 spiral arranged with respect to each other under a folding angle of about 60 degrees, wherein all three receiver coils 300 are arranged with respect to each other under a folding angle 305 of about 60 degrees, wherein each first spiral 301 of a receiver coil 300 of the three receiver coils overlaps with a second spiral 303 of another receiver coil 300 of the three receiver coils located next to the receiver coil.

Figure 8B:
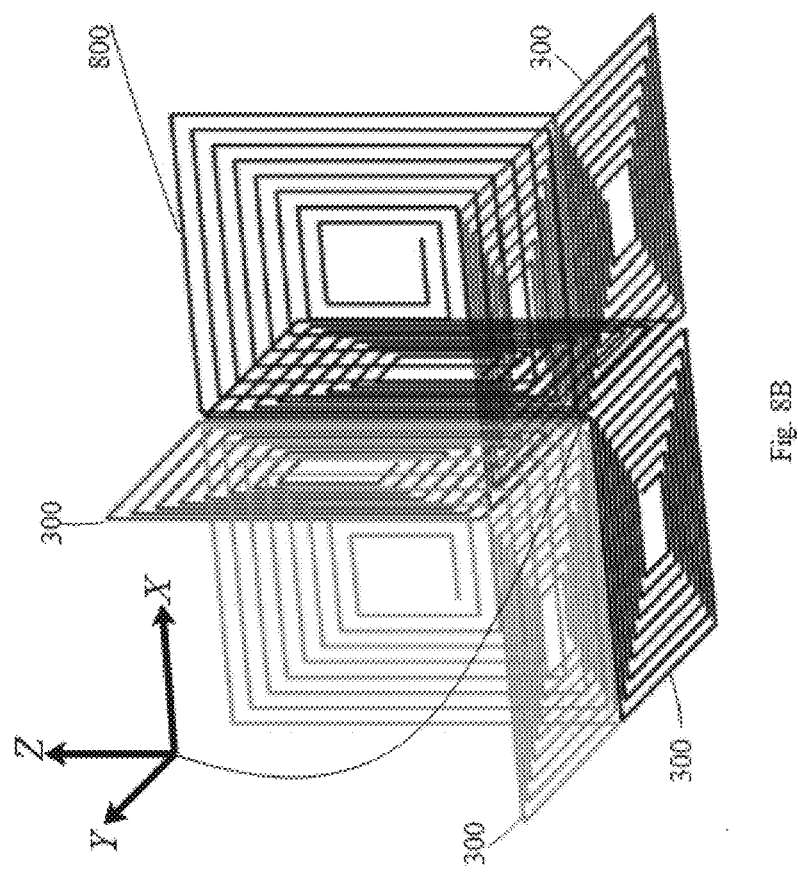
FIG. 8B shows a 3-dimensional representation of the wireless power transmitter arrangement 800 of FIG. 8A.
Figure 8A:
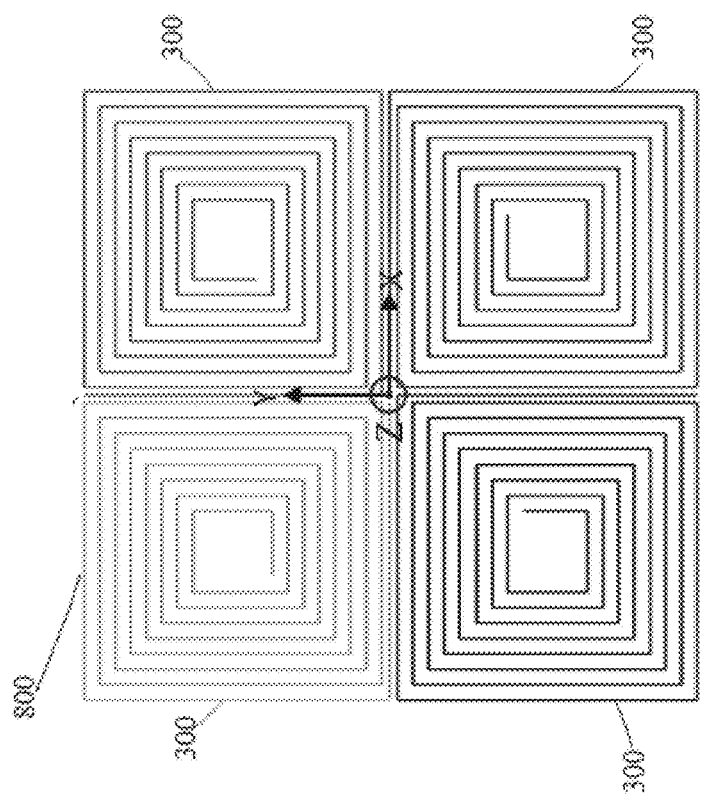
FIG. 8A shows a schematic diagram illustrating inductive elements of a wireless power transmitter arrangement 800 composed by four composed coils 300 according to an example.

In one example, e.g. as shown in FIGS. 8A and 8B, the wireless power receiver device 108, 800 may comprise four receiver coils 300, each receiver coil 300 composed of a first 301 and a second 303 spiral arranged with respect to each other under a folding angle of about 90 degrees, wherein all four receiver coils 300 are arranged with respect to each other under a folding angle 305 of about 90 degrees, wherein the first spirals 301 of the four receiver coils 300 are arranged in a first plane, wherein the second spirals of two receiver coils of the four receiver coils are arranged in a second plane perpendicular to the first plane, and wherein the second spirals of the other two receiver coils of the four receiver coils are arranged in a third plane perpendicular to both the first and the second plane.

Figure 9B:
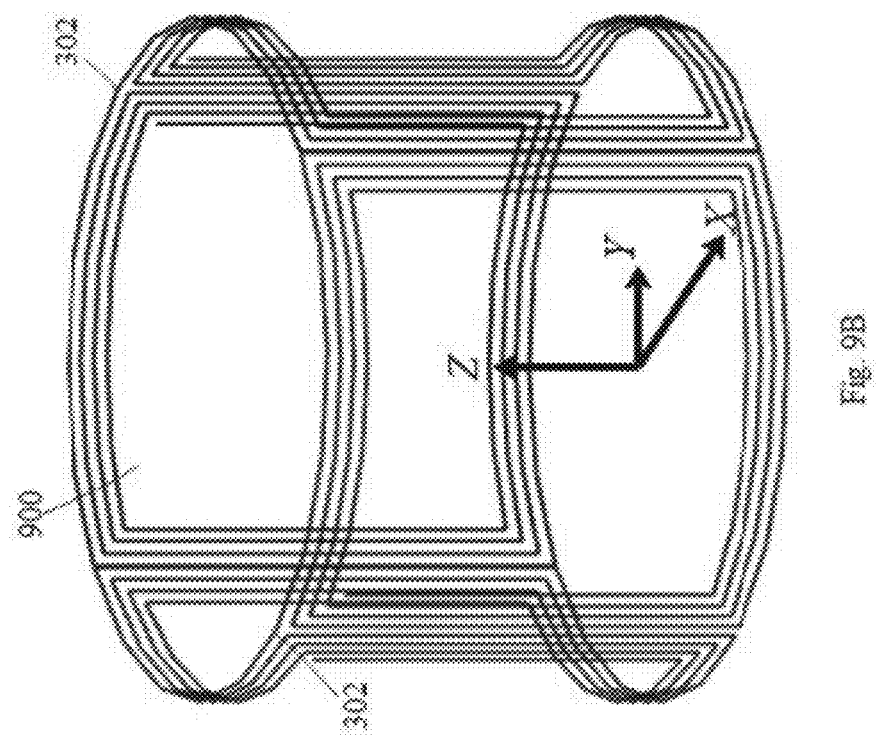
FIG. 9B shows a 3-dimensional representation of the wireless power transmitter arrangement 900 of FIG. 9A.
Figure 9A:
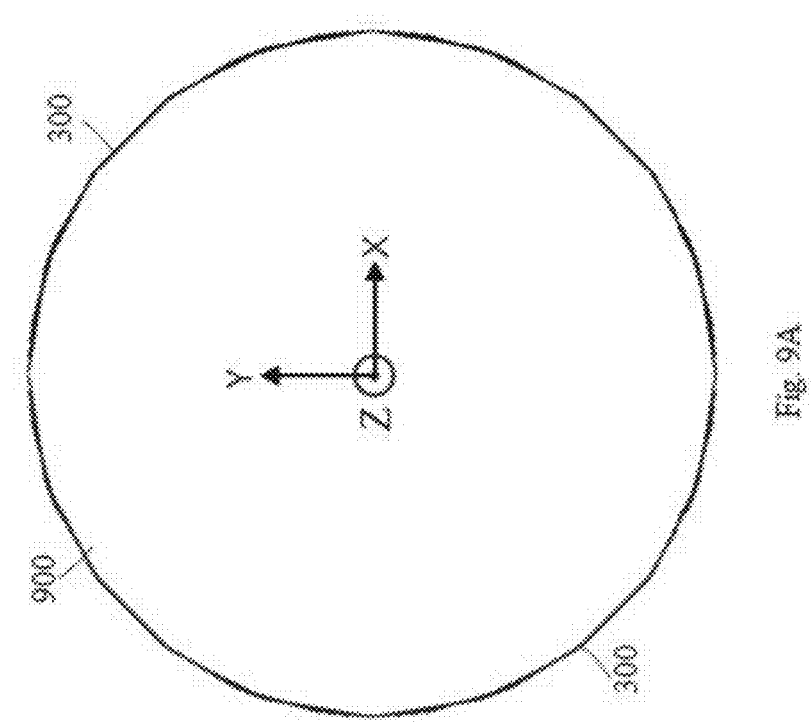
FIG. 9A shows a schematic diagram illustrating inductive elements of a wireless power transmitter arrangement 900 composed by two composed coils 300 according to an example.

In one example, e.g. as shown in FIGS. 9A and 9B, the wireless power receiver device 108, 900 may comprise two receiver coils 300, each receiver coil 300 composed of a first 301 and a second 303 spiral which are bent with respect to each other under a radius of curvature, wherein the two receiver coils 300 are bent with respect to each other under a radius of curvature.

In this disclosure the composed coils of the disclosed technology can be used as the inductive component of resonator arrangements used as transmitters or receivers of wireless power transfer systems. Some possible configurations are shown in the examples of FIGS. 4 to 9 described in the following.

FIG. 4A shows a schematic diagram illustrating inductive elements of a wireless power transmitter arrangement 400 composed by two composed coils 300 according to an example. FIG. 4B shows a 3-dimensional representation of the wireless power transmitter arrangement 400 of FIG. 4A.

FIG. 4 (FIG. 4A and FIG. 4B) shows the inductive elements of a wireless power transmitter arrangement 400 composed by two composed coils 300 of the disclosed technology. The two composed coils have a folding angle 305 of 90 degrees and they face each other. In this embodiment, both coils are positioned at the same height with respect to each other, but there can be configurations in which the height is different. The direction of the circulating current exciting each composed coil has been chosen in a manner that the magnetic north pole of the individual spirals points out of the transmitter coil arrangement. By changing the direction of the circulating current for a given winding direction or by inverting the winding direction for a given circulating current permits to have the magnetic north pole point outwards or inwards of the coil arrangement.

FIG. 5A shows a schematic diagram illustrating inductive elements of a wireless power transmitter arrangement 500 composed by two composed coils 300 and one additional single-spiral coil according to an example. FIG. 5B shows a 3-dimensional representation of the wireless power transmitter arrangement 500 of FIG. 5A.

FIG. 5 (FIG. 5A and FIG. 5B) shows the inductive elements of a wireless power transmitter arrangement 500 composed by two composed coils 300 of the disclosed technology and one additional single-spiral coil. The two composed coils have a folding angle 305 of 90 degrees and they face each other, the individual coil 501 is located on the XY plane on top of the composed-coils arrangements. The direction of the circulating current exciting each coil of this arrangement has been chosen in a manner that the magnetic north pole of every spiral points out of the transmitter coil arrangement. By changing the direction of the circulating current for a given winding direction or by inverting the winding direction for a given circulating current permits to have the magnetic north pole point outwards or inwards of the coil arrangement.

FIG. 6A shows a schematic diagram illustrating inductive elements of a wireless power transmitter arrangement 600 composed by four composed coils 300 according to an example. FIG. 6B shows a 3-dimensional representation of the wireless power transmitter arrangement 600 of FIG. 6A.

FIG. 6 (FIG. 6A and FIG. 6B) shows the inductive elements of a wireless power transmitter arrangement 600 composed by four composed coils 300 of the disclosed technology. All composed coils have a folding angle 305 of 90 degrees and each of the individual spirals of a composed coil overlap with one of the individual spirals of the composed coils next to it. The direction of the circulating current exciting each coil of this arrangement has been chosen in a manner that the magnetic north pole of every spiral points out of the transmitter coil arrangement. By changing the direction of the circulating current for a given winding direction or by inverting the winding direction for a given circulating current permits to have the magnetic north pole point outwards or inwards of the coil arrangement.

FIG. 7A shows a schematic diagram illustrating inductive elements of a wireless power transmitter arrangement 700 composed by three composed coils 300 according to an example. FIG. 7B shows a 3-dimensional representation of the wireless power transmitter arrangement 700 of FIG. 7A.

FIG. 7 (FIG. 7A and FIG. 7B) shows the inductive elements of a wireless power transmitter arrangement 700 composed by three composed coils 300 of the disclosed technology. All composed coils have a folding angle 305 of 60 degrees and each of the individual spirals of a composed coil overlap with one of the individual spirals of the composed coils next to it. The direction of the circulating current exciting each coil of this arrangement has been chosen in a manner that the magnetic north pole of every spiral points out of the transmitter coil arrangement. By changing the direction of the circulating current for a given winding direction or by inverting the winding direction for a given circulating current permits to have the magnetic north pole point outwards or inwards of the coil arrangement.

FIG. 8A shows a schematic diagram illustrating inductive elements of a wireless power transmitter arrangement 800 composed by four composed coils 300 according to an example. FIG. 8B shows a 3-dimensional representation of the wireless power transmitter arrangement 800 of FIG. 8A.

FIG. 8 (FIG. 8A and FIG. 8B) shows the inductive elements of a wireless power transmitter arrangement 800 composed by four composed coils 300 of the disclosed technology. All composed coils have a folding angle 305 of 90 degrees. In contrast to the composed coils of FIG. 4 to 7, the folding angle has been made with respect to the X or Y axes instead of the Z axis. The direction of the circulating current exciting each coil of this arrangement has been chosen in a manner that the magnetic north pole of every spiral points out of each spiral. By changing the direction of the circulating current for a given winding direction or by inverting the winding direction for a given circulating current permits to have the magnetic north pole point outwards or inwards of the coil arrangement.

FIG. 9A shows a schematic diagram illustrating inductive elements of a wireless power transmitter arrangement 900 composed by two composed coils 300 according to an example. FIG. 9B shows a 3-dimensional representation of the wireless power transmitter arrangement 900 of FIG. 9A.

FIG. 9 (FIG. 9A and FIG. 9B) shows the inductive elements of a wireless power transmitter arrangement 900 composed by two composed coils 300 of the disclosed technology. These two coils, in contrast to the ones showed in FIG. 4-8 are bent with a certain radius of curvature instead of a sharp folding angle. The direction of the circulating current exciting each coil of this arrangement has been chosen in a manner that the magnetic north pole of every spiral points out of each spiral. By changing the direction of the circulating current for a given winding direction or by inverting the winding direction for a given circulating current permits to have the magnetic north pole point outwards or inwards of the coil arrangement.

The resonator arrays based on the disclosed coil geometries can be made with a combination of composed spirals only, like the ones in FIG. 4, FIG. 6-9 or a combination of single and composed geometries, like in FIG. 5.

The arrays can be composed by overlapping (FIG. 6, FIG. 7) coil geometries or non-overlapping making the electromagnetic coupling between the individual resonators non-strict a certain value.

Figure 10C:
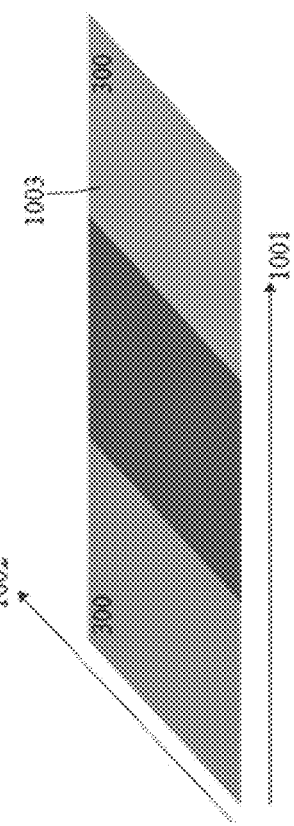
FIG. 10C shows a schematic diagram illustrating an resonator array for a wireless power transfer system having a semi-planar shape 1003 according to an example.
Figure 10B:
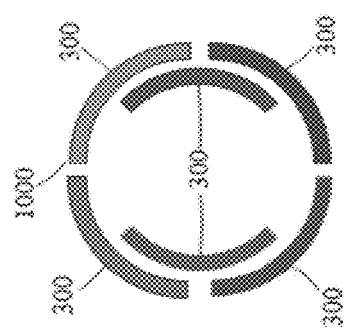
FIG. 10B shows a schematic diagram illustrating an resonator array for a wireless power transfer system having a spherical like shape 1000 according to an example.
Figure 10A:
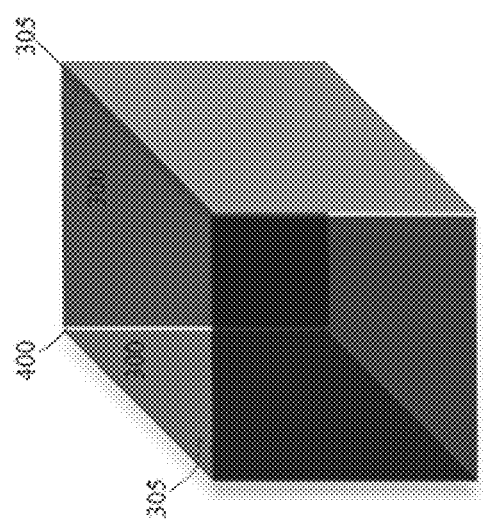
FIG. 10A shows a schematic diagram illustrating an resonator array for a wireless power transfer system having a cuboid like shape according to an example.

FIG. 10A shows a schematic diagram illustrating a resonator array for a wireless power transfer system having a cuboid like shape according to an example. FIG. 10B shows a schematic diagram illustrating a resonator array for a wireless power transfer system having a spherical like shape 1000 according to an example. FIG. 10C shows a schematic diagram illustrating a resonator array for a wireless power transfer system having a semi-planar shape 1003 according to an example.

The resonator arrays can have a cuboid like 400 (FIG. 10A), spherical like 1000 (FIG. 10B) or semi-planar 1003 (FIG. 10C) shapes. In the case of semi-planar arrangements, they can extend in either one of the two principal directions 1001 or 1002.

Figure 11A:
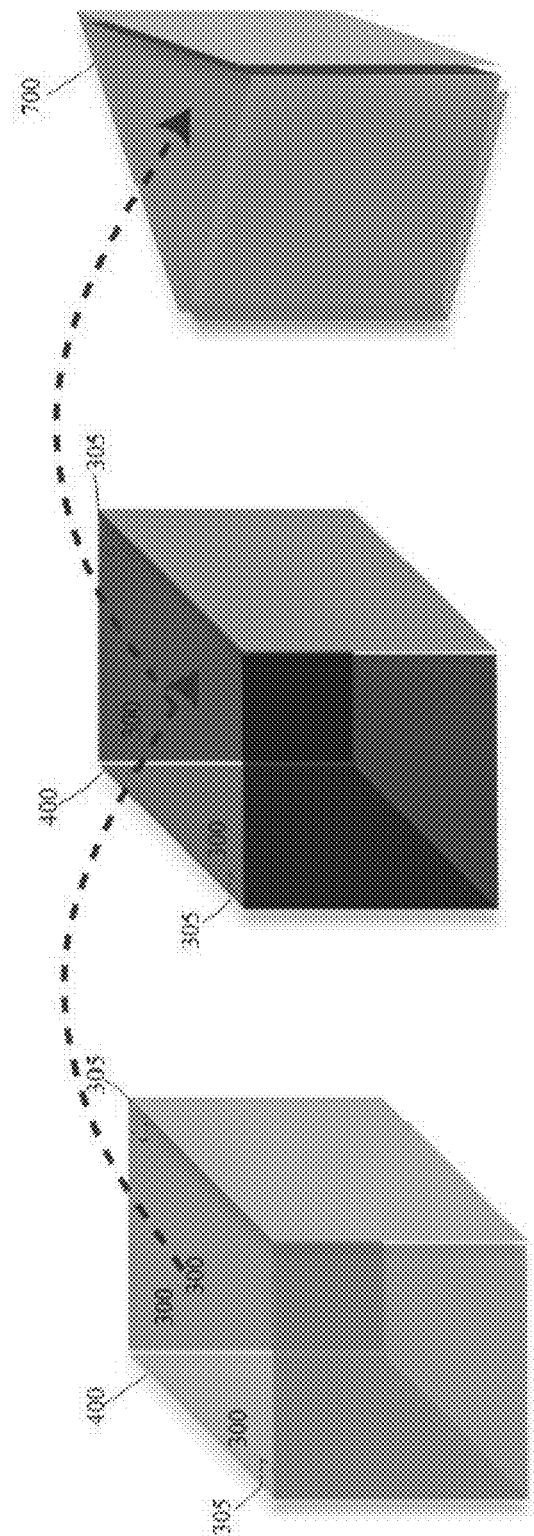
FIG. 11A shows a schematic diagram illustrating an wireless power transfer system including an intermediate system with relaying function according to an example.
Figure 11B:
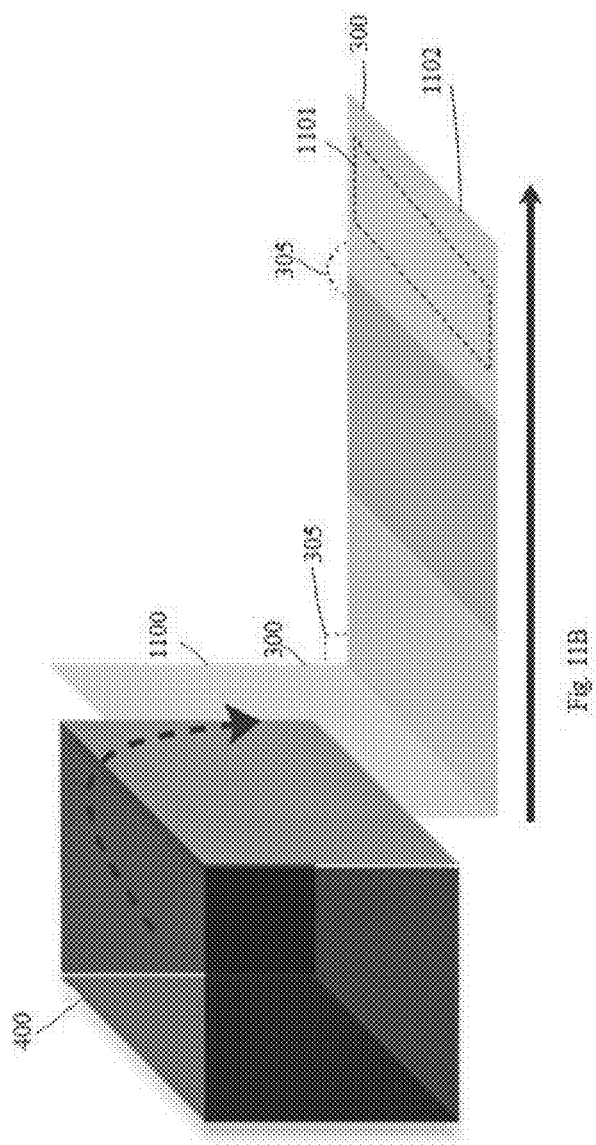
FIG. 11B shows a schematic diagram illustrating an wireless power transfer system including an intermediate system with relaying function implemented by two of composed resonators 300 according to an example.

FIG. 11A shows a schematic diagram illustrating a wireless power transfer system including an intermediate system with relaying function according to an example. FIG. 11B shows a schematic diagram illustrating a wireless power transfer system including an intermediate system with relaying function implemented by two of composed resonators 300 according to an example.

In order to extend the transmission distance from a transmitter to a receiver(s) the system may include an intermediate system with the function of relaying the power sent from the transmitter to end-receiver(s) meaning that the proposed resonator arrangements can also behave as a receiver arrangement. This situation can be seen in FIG. 11A between volumetric resonator arrays. The part of the energy sent from the arrangement 400 reaches arrangement 700 by passing first through arrangement 400 in between. FIG. 11B shows the case in which part of the energy sent by the transmitter arrangement 400 reaches the receiver device 1101 by being relayed by the intermediate transmitter arrangement 1100, exemplified here by two of composed resonators 300, the resonator 1100 with a 90 degrees folding angle 305 and the resonator 1102 with a 180 degrees folding angle 305, these two resonators are coupled via one of its individual spirals.

The disclosed technology also presents wireless power transmission systems that are able to increase the power transfer efficiency to the target device(s) by controlling either the magnitudes or phases of the AC power sources that feed every resonator of the transmitter array. This is possible by sensing the location of the receiver device(s) with respect to the immobile transmitter arrangement. This type of systems are represented by FIG. 12 and FIG. 13.

FIG. 12 shows a schematic diagram illustrating a wireless power transfer system 1200 according to an example.

FIG. 12 shows a block diagram of a wireless power transfer system 1200 capable of adjusting the characteristics of the AC source 1208 according to the receiver 1214. This is achieved with the use of a power detection unit 1203 that is directly affected by a possible change in the location of the receiver(s). When a receiver device is moved from a previous to a new location, because of the electromagnetic coupling 1212 that exists between the receiver resonator or resonator array 1214 and the transmitter resonator or resonator array 1202, there will be a change reflected on the transmitter resonator or resonator array 1202 by a change in the impedance with which the receiver device 1213 loads the transmitter 1202.

For example, in the case where the receiver 1214 is composed by one single resonator with a total impedance of $Z_{Rx}$ and that it is connected to a load $R_L$ in series, the impedance "reflected" $Z_{reflected}$ to each resonator of the transmitter array is given by:

$$Z_{reflected} = \frac{\omega^2 M_{Rx \to Tx}^2}{Z_{Rx} + R_L} \quad (5)$$

Where $\omega$ is the angular operation frequency and $M_{Rx \to Tx}$ is the mutual inductance between the single receiver resonator and a given transmitter resonator.

In this figure, the power detection unit is embodied by a bi-directional coupler 1204 connected as a reflectometer and that in turn is connected to an RF detector circuit 1205. The power detection unit may be comprised by other voltage/current/impedance/power sensitive circuit that will be directly affected by (5) for a changing coupling condition of the receiver(s). The power detection unit in this figure is connected to a data processing and storage unit 1206 that can be accomplished with a central processing unit, a microcomputer or a microcontroller in charge of sampling and processing the analogue voltage coming out of the power detection unit 1204 to effectively set the operating conditions of phase shifter or an amplitude controller 1209 connected to the AC source 1208 that sends the AC power to the transmitter resonator or resonator array 1202 through the power detection unit 1204. The data processing/storage 1206 unit is also affected by the information coming from a wireless communication stage 1207 in the transmitter device 1201 which is cable to wirelessly communicate to the wireless communication stage 1219 in the receiver device 1213 through electromagnetic waves 1220. The two wireless communication stages 1207 and 1219 may exchange information via two distinct transducers compatible with, but not limited to Bluetooth, BLE, ZigBee, WiFi, WLAN, Thread, cellular communications like 2G/3G/4G/5G/LTE, NB-IoT, NFC, RFID, WirelessHART, among others. On the receiver device 1213, the wireless communication 1219 stage may aid in controlling a charging circuit 1216 via another data processing and storage unit that may be present in the receiver device 1213.

FIG. 13 shows a schematic diagram illustrating a wireless power transfer system 1300 according to an example.

C FIG. 12, the embodiment in FIG. 13 shows a system 1300 in which the change in the coupling conditions of the receiver(s) devices are not monitored through the electromagnetic coupling of the transmitter and receiver resonator or resonator arrays 1321 but through the one 1323 between another pair of resonators or resonator arrays 1302 and 1314 present in the transmitter 1301 and the receiver 1322 devices. These resonators work at another operating frequency at which the wireless power exchange takes place and may be located close to the power resonator or resonator arrays 1313 and 1320 of the system.

They may be, for example, implemented in another layer of a multiple-layered-PCB so as to monitor the change in the position of a moving receiver device. FIG. 13. Shows that the sensing resonator or array 1302 may be connected to a power detection unit 1303 that is directly affected by a possible change in the location of the detectable resonator or resonator array on the receiver device(s) 1322.

When a receiver device is moved from a previous to a new location, because of the electromagnetic coupling 1323 that exists between the detectable resonator or resonator array, a change will be induced on the sensing resonator or resonator array 1302 by a change in the impedance with which the receiver device 1322 loads the transmitter 1301.

For example, in the case where a detectable resonator 1314 is composed by one single resonator with a total impedance of $Z_{Dx}$ and that it is connected to a load $R_L$ in series, the detected impedance $Z_{detected}$ to each resonator of the sensing array $S_x$ is given by:

$$Z_{detected} = \frac{\omega^2 M_{Dx \to Sx}^2}{Z_{Dx} + R_L} \quad (6)$$

Where ω is the angular operation frequency and $M_{Dx \to Sx}$ is the mutual inductance between the single detectable resonator and a given sensing resonator.

In this figure, the power detection unit is embodied by a bi-directional coupler 1304 connected as a reflectometer and that in turn is connected to an RF detector circuit 1305. The power detection unit may be comprised by other voltage/current/impedance/power sensitive circuit that will be directly affected by (6) for a changing coupling condition of the receiver(s). The power detection unit in this figure is connected to a data processing and storage unit 1306 that can be accomplished with a central processing unit, a microcomputer or a microcontroller in charge of sampling and processing the analogue voltage coming out of the power detection unit 1304 to effectively set the operating conditions of phase shifter or an amplitude controller 1309 connected to the AC source 1310 that sends the AC power to the transmitter resonator or resonator array 1313. Note that in this system, the power detection unit 1304 has its own AC source 1308 capable of generating an excitation signal for the sensing resonator or resonator array 1302 at another frequency than at which the wireless power takes place. The data processing/storage 1306 unit is also affected by the information coming from a wireless communication stage 1307 in the transmitter device 1301 which is cable to wirelessly communicate to the wireless communication stage 1317 in the receiver device 1322 through the exchange of information via two distinct transducers compatible with, but not limited to Bluetooth, BLE, ZigBee, WiFi, WLAN, Thread, cellular communications like 2G/3G/4G/5G/LTE, NB-IoT, NFC, RFID, WirelessHART, among others. On the receiver device 1322, the wireless communication 1317 stage may aid in controlling a charging circuit 1316 via another data processing and storage unit that may be present in the receiver device 1322.

In the systems presented in FIG. 12 and FIG. 13 there is a script running inside the data processing and storage unit cable of gathering the relevant information related to the coupling conditions of the receiver(s) and other information like the level of the charge of the battery in the receiver device whenever one is present. In order to compensate for a changing coupling condition, a phase shifter or an amplitude controller will change the phase or amplitude of each of AC sources exciting the transmitter resonator or resonator array.

A phase shifter will change the transmission phase angle of an input signal while leaving the amplitude of the input signal being affected by the insertion loss of the component. The input signal will be shifted in phase at the output based on the configuration of the phase shifter. The phase shifter may be digital, analogue or mechanical. In another implementation of the systems of FIG. 12 and FIG. 13, the change in the phase of the sources of the system can be achieved by a controllable function generator implemented with a Field Programmable Gate Array (FPGA) that applies an input signal to a radio frequency power amplifier AC source. In other implementation of the systems of FIG. 12 and FIG. 13, instead of controlling the phase of each AC source in the systems that excite the transmitter resonator or resonator array, there can be an amplitude control circuit that varies the amplitude of the AC voltage or current source according to the reflected impedance coming from the receiver.

This control circuit may allow for the amplitude to vary only between the 0 and 100% of the amplitude or inside the range 0-100%. In the case of the "on" and "off" operations it can be considered that a transmitter resonator in the "on" state will have an equivalent impedance very different to one in the "off" state. An "off" state can be achieved by detuning via another strongly coupled resonator, by physical removal or a conductive track that will effectively impede the flow of electrons in the resonator(s) or by a direct detuning or switching. This variation between states, regarded as switching can be achieved by the use of single or a combination of transistors including but not limited to FET, MOSFET, GAN, GAN HEMT, among others.

In other implementations of the systems in FIG. 12 and FIG. 13, the communication between the transmitter and receiver devices can be done via the wireless power channel 1212 for FIG. 12 and via the sensing channel 1323 or via the wireless power channel 1321. This means that in some implementations of this systems, there is no need to have a communications unit. This can be achieved by having resonators with a wider bandwidth and with two resonance frequencies that allow to send a wireless power signal that is not composed of a single component, for example, the wireless power signal may be modulated in amplitude by a carrier signal. In this other implementation, the transmitter and receiver devices require a modulator and demodulator stages, respectively.

The benefits of the wireless transmission concept presented in this disclosure are given now in terms of efficiency calculated as expressed by equation (4). The calculation of the efficiency is done according to a receiver motion inside a volume extending outwards of the transmitter arrangement being analyzed. According to the transmitter construction, it would be possible to supply to a receiver(s) located in any point inside a sphere with a radius equal or smaller than the radius in which the energy from the transmitter is still able to reach the receiver, this is because the exchange of energy between the transmitter and receiver happens inside the near-field generated by the transmitter. Since the transmitter arrangements are non-radiative because their physical size is smaller than the wavelength at the operating frequency.

Figure 14:
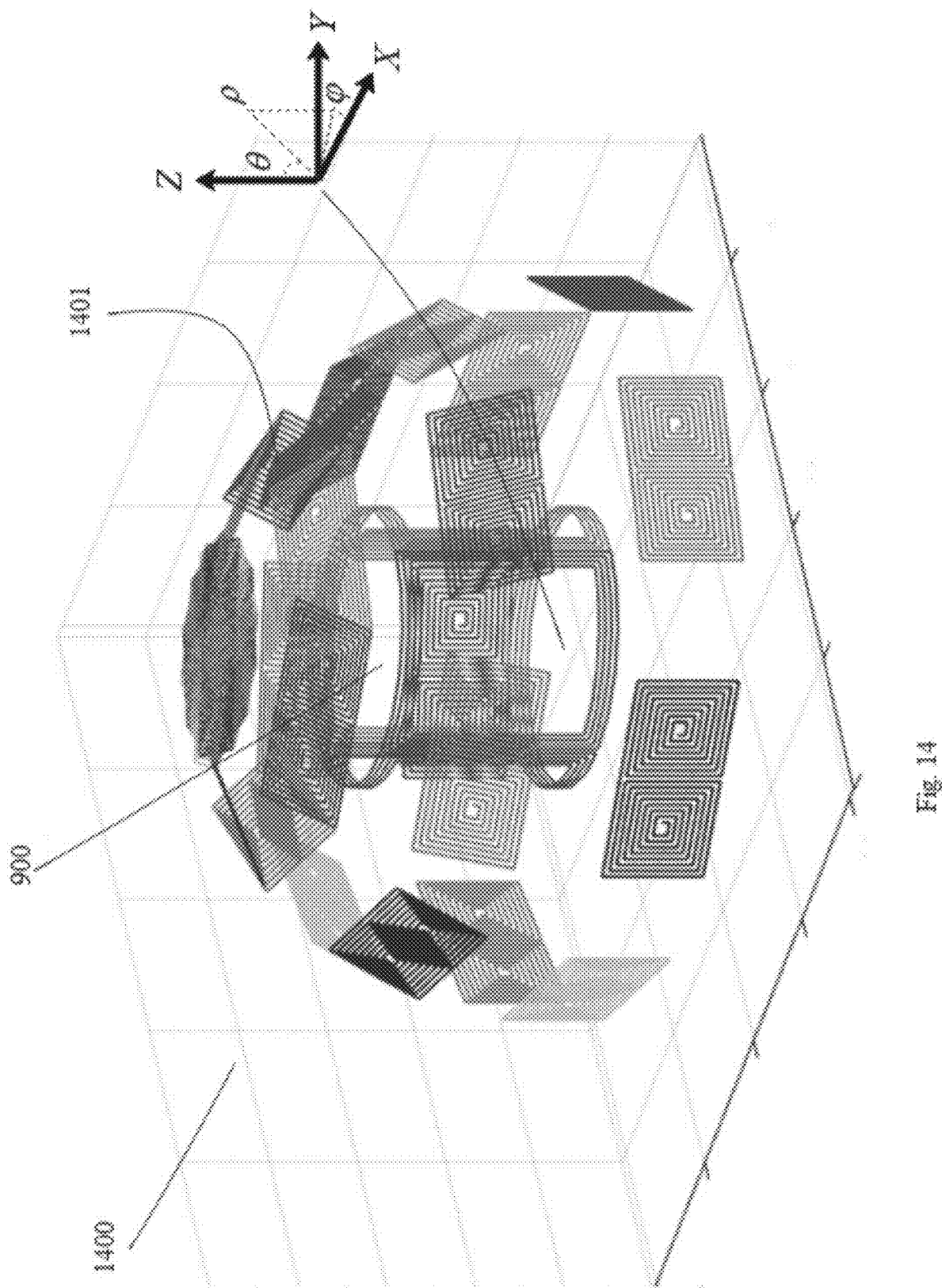
FIG. 14 shows a schematic diagram illustrating an wireless power receiver resonator 1401 scanning half a sphere around an wireless power transmitter arrangement 900 according to an example.

FIG. 14 shows a schematic diagram illustrating a wireless power receiver resonator 1401 scanning half a sphere around a wireless power transmitter arrangement 900 according to an example.

In FIG. 14 the receiver was positioned in a three-dimensional spaced given in cylindrical coordinates. The receiver 1401 scanned half a sphere around the transmitter arrangement, here the arrangement 900 is given as an example, in 180 steps in both the polar and azimuthal angles at a constant or variable radius, as depicted in by FIG. 14. Although in this figure the receiver resonator 1401 corresponds to a composed coil geometry of the disclosed technology with a folding angle of 180 degrees, it may have other coil geometry.

FIG. 15A shows a 3-dimensional representation of the wireless power transmitter arrangement 500 of FIGS. 5A and 5B. FIG. 15B shows a 3-dimensional field diagram of the wireless power transmission efficiency between the wireless power transmitter arrangement 500 of FIG. 15A and a receiver resonator with a certain load in a top view. FIG. 15C shows a 3-dimensional field diagram of the wireless power transmission efficiency between the wireless power transmitter arrangement 500 of FIG. 15A and a receiver resonator with a certain load in a side view. The efficiency plots show the magnetic field homogenization capabilities due to the direct proportionality of the two quantities.

The presented composed coil geometries have the ability to homogenize the magnetic field around the transmitter array as demonstrated by FIG. 15B (top view) and FIG. 15C (side view) that shows the power transmission efficiency (4) between the transmitter arrangement 500 and a moving receiver 900 as the one shown in FIG. 14 at a constant radius from the origin in FIG. 15A. In this picture, each transmitter resonator is connected to an individual power supply. All power supplies have the same magnitude and phase. The magnetic field homogenization capability happens because a moving receiver device is able to maintain a similar mutual inductance to a composed coil while transitioning from one face of the transmitter arrangement to the next and because the winding direction of the individual spirals composing the coils have been established as to avoid the cancelation of the magnetic field in all faces of the transmitter arrangement.

FIG. 16A shows a 3-dimensional representation of the wireless power transmitter arrangement 500 of FIGS. 5A and 5B. FIG. 16B to 16F show 3-dimensional field diagrams illustrating wireless power transmission efficiency between the transmitter arrangement of FIG. 16A and a receiver according to FIG. 14 for an increasing radius from the origin of the transmitter arrangement 500.

The presented composed coil geometries and the arrangements of the disclosed technology can homogenize the magnetic field at increasing radius of separation between the origin of the exemplified transmitter arrangement in FIG. 16A and a receiver moving like described in FIG. 14. This permits the disclosed technology to be able to transmit wireless power to a receiver device with differing coupling conditions with high efficiency even when no control method is applied or when there is nothing done to compensate for the change in coupling conditions of the receiver by adjusting the impedances of the transmitter/receiver resonators. This benefit is exemplified by FIG. 16B-F that show the wireless power transmission efficiency between the transmitter arrangement and the receiver for an increasing radius from the origin of the transmitter shown in FIG. 16A.

FIG. 17A shows a 3-dimensional representation of the wireless power transmitter arrangement 400 of FIGS. 4A and 4B. FIG. 17B shows a 3-dimensional field diagram illustrating wireless power transmission efficiency between the transmitter arrangement of FIG. 17A and a receiver according to FIG. 14 for a constant radius from the origin of the transmitter arrangement 400. FIG. 17C shows a 3-dimensional representation of the wireless power transmitter arrangement 600 of FIGS. 6A and 6B. FIG. 17D shows a 3-dimensional field diagram illustrating wireless power transmission efficiency between the transmitter arrangement of FIG. 17C and a receiver according to FIG. 14 for a constant radius from the origin of the transmitter arrangement 600. FIG. 17E shows a 3-dimensional representation of the wireless power transmitter arrangement 700 of FIGS. 7A and 7B. FIG. 17F shows a 3-dimensional field diagram illustrating wireless power transmission efficiency between the transmitter arrangement of FIG. 17E and a receiver according to FIG. 14 for a constant radius from the origin of the transmitter arrangement 700. FIG. 17G shows a 3-dimensional representation of the wireless power transmitter arrangement 900 of FIGS. 9A and 9B. FIG. 17H shows a 3-dimensional field diagram illustrating wireless power transmission efficiency between the transmitter arrangement of FIG. 17G and a receiver according to FIG. 14 for a constant radius from the origin of the transmitter arrangement 900.

The presented arrangements of the disclosed technology can supply to multiple receivers simultaneously due to their magnetic field homogenization capabilities. This is exemplified by the efficiency calculations shown in FIG. 17 between four, 400, 600, 700, 900, of the transmitter resonator arrangements and a receiver device moving around the volume of the transmitter with a constant radius from their respective origin as described in FIG. 14. In this picture, each transmitter resonator of each arrangement analyzed is connected to an individual power supply and all power supplies have the same magnitude and phase. These arrangements can be used as a functional wireless chargers located in the center of a living room table with the task of supplying wireless power to the distinct receiver devices belonging to persons sitting around that table.

FIG. 18A shows a 3-dimensional representation of the wireless power transmitter arrangement 500 of FIGS. 5A and 5B. FIG. 18B shows a 3-dimensional field diagram in a top view illustrating wireless power transmission efficiency between the transmitter arrangement of FIG. 18A and a moving receiver according to FIG. 14 at a constant radius from the origin of the transmitter arrangement 500. FIG. 18C shows a 3-dimensional field diagram in a side view illustrating wireless power transmission efficiency between the transmitter arrangement of FIG. 18A and a moving receiver according to FIG. 14 at a constant radius from the origin of the transmitter arrangement 500.

Another benefit of the disclosed coils, arrays and the control methods is that it is possible to activate/deactivate certain resonators of the transmitter system in order to avoid that energy is sent to omnidirectional when there is only one receiver or a group of receiver devices located at the same zone around the transmitter array. This is demonstrated in FIG. 18B (top view) and FIG. 18C (side view) that shows the power transmission efficiency (4) between the transmitter arrangement 500 and a moving receiver 900 as the one shown in FIG. 14 at a constant radius from the origin in FIG. 18A. In this figure, only the transmitter resonator 1801 is active, i.e., in the "on" state while the resonators 1802 and 1803 are inactive, i.e., in the "off" state. The efficiency surface plots show that not the energy travels farther and more efficiently in to the active area.

FIG. 19A shows a 3-dimensional representation of the wireless power transmitter arrangement 500 of FIGS. 5A and 5B. FIGS. 19B to 19C show 3-dimensional field diagrams in side view (FIG. 19B) and top view (FIG. 19C) illustrating wireless power transmission efficiency between the transmitter arrangement of FIG. 19A and a moving receiver according to FIG. 14 at a constant radius from the origin of the transmitter arrangement 500 when phase shifting control is applied. FIGS. 19D to 19E show 3-dimensional field diagrams in side view (FIG. 19D) and top view (FIG. 19E) illustrating wireless power transmission efficiency between the transmitter arrangement of FIG. 19A and a moving receiver according to FIG. 14 at a constant radius from the origin of the transmitter arrangement 500 when amplitude control is applied.

The efficiency enhancing abilities of the control methods disclosed in the systems of FIG. 12 or FIG. 13 are demonstrated in FIG. 19. In this case, the same transmitter arrangement 500, whose behavior on conjunction with a system in which the AC sources of the transmitter resonators had the same amplitude and phase was demonstrated in FIG. 15, is analyzed as well. The figure shows the power transmission efficiency (4) between the transmitter arrangement 500 and a moving receiver 900 as the one shown in FIG. 14 at a constant radius from the origin in FIG. 19A which is also the same radius as the one in FIG. 15A. FIG. 19B and FIG. 19C show the surface plot of the efficiency from the side (FIG. 19B) and from the top (FIG. 19C) when the phase shifting control method is applied. At every positioning of the receiver, the phases of the AC sources supplying to the three transmitter resonators were set to a value either of 0, or 90 or +−180 degrees while maintaining the same amplitude for the three AC sources. FIG. 19D and FIG. 19E show the surface plot of the efficiency from the side (FIG. 19D) and from the top (FIG. 19E) when the amplitude control method is applied. At every positioning of the receiver, the amplitude of the AC sources supplying to the three transmitter resonators were set to a value in the range of 0 to 100% while maintaining the same phase for the three AC sources.

FIG. 20A shows a 3-dimensional representation of the wireless power transmitter arrangement 600 of FIGS. 6A and 6B. FIG. 20B shows a surface plot representing a 3-dimensional field diagram in a side view illustrating wireless power transmission efficiency between the transmitter arrangement of FIG. 20A and a moving receiver according to FIG. 14. FIG. 20C shows a surface plot representing a 3-dimensional field diagram in a top view illustrating wireless power transmission efficiency between the transmitter arrangement of FIG. 20A and a moving receiver according to FIG. 14. FIG. 20D shows a 3-dimensional representation of the wireless power transmitter arrangement 700 of FIGS. 7A and 7B. FIG. 20E shows a surface plot representing an 3-dimensional field diagram in a side view illustrating wireless power transmission efficiency between the transmitter arrangement of FIG. 20D and a moving receiver according to FIG. 14. FIG. 20F shows a surface plot representing a 3-dimensional field diagram in a top view illustrating wireless power transmission efficiency between the transmitter arrangement of FIG. 20D and a moving receiver according to FIG. 14. FIG. 20G shows a 3-dimensional representation of the wireless power transmitter arrangement 800 of FIGS. 8A and 8B. FIG. 20H shows a surface plot representing a 3-dimensional field diagram in a side view illustrating wireless power transmission efficiency between the transmitter arrangement of FIG. 20G and a moving receiver according to FIG. 14. FIG. 20I shows a surface plot representing a 3-dimensional field diagram in a top view illustrating wireless power transmission efficiency between the transmitter arrangement of FIG. 20G and a moving receiver according to FIG. 14. FIG. 20J shows a 3-dimensional representation of the wireless power transmitter arrangement 900 of FIGS. 9A and 9B. FIG. 20K shows a surface plot representing a 3-dimensional field diagram in a side view illustrating wireless power transmission efficiency between the transmitter arrangement of FIG. 20J and a moving receiver according to FIG. 14. FIG. 20L shows a surface plot representing a 3-dimensional field diagram in a top view illustrating wireless power transmission efficiency between the transmitter arrangement of FIG. 20J and a moving receiver according to FIG. 14.

The disclosed technologies also have the ability to geometrically shape the available wireless energy in space, this can be beneficial in different application scenarios, for example, for electrical industrial robots with a defined trajectory or different shapes of tables inside conference rooms meant to provide wireless power to the attendees of the meeting. This is exemplified by the efficiency calculations shown as surface plots in FIG. 20 between four, 600, 700, 800, 900, of the transmitter resonator arrangements and a receiver device moving around the volume of the transmitter with a constant radius from their respective origin as described in FIG. 14. In this picture, each transmitter resonator of each arrangement analyzed is connected to an individual power supply and the control method based on different amplitude for the AC source supplying to the resonators is applied according to the receiver position while maintaining the same phase for each.

For comparing the different behaviors obtained from each arrangement, all arrangements have been designed to occupy the same volume, this means that, for example for the transmitter resonator arrangement shown in FIG. 20G, the overall power transmission efficiency is expected to be smaller due to the reduced electromagnetic coupling between the smaller resonators and the receiver device for a constant separation radius from the depicted origin, than that between the resonator arrays of FIG. 20A, FIG. 20D, and FIG. 20J and the receiver device. The surface plots at the middle column of this figure show the side view of the efficiency (FIGS. 20B, 20E, 20H, and 20K), while the surface plots at the right column of this figure show the top view (FIGS. 20C, 20F, 20I, and 20L) for the same operating conditions.

The disclosure relates to wireless power transmission as described above including all possible transmitter and/or receiver for wireless power transfer employing the disclosed composed geometries in any of the described forms, for example: a) any type of composed geometry for the inductive element of a resonator for wireless power transfer with any coil geometry, any type of connection to achieve a composed geometry, any type of bending, any type of fabrication method, any type of materials used for the fabrication method; b) any combination of coils at the transmitter and receiver units where the number of composed geometries should be greater or equal to one and the number of single (not composed) geometry should be greater or equal to zero; c) any special arrangement coils based in both composed and single geometries according to a) and b) that may function as a combination of arrangements as well to extend the range of the wireless power transmission.

The disclosure further relates to the use of the geometries described above in combination with any of the following control methods: Constant phase and amplitude; Variable phase and constant amplitude; and Variable amplitude and constant phase; and any possible hardware and/or software to achieve such a control method. For example, the receiver device can be located by means of a camera mounted inside the volume of the transmitter array instead of an electromagnetic coupling-based sensing method.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labelling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as described herein.

What is claimed is:

1. A wireless power transmitter device comprising:
   at least one transmitter coil configured to act as an inductive element of at least one inductive-capacitive resonator, wherein the at least one transmitter coil is configured to, upon excitation with a time-varying voltage, produce a time varying electromagnetic field configured to cause a circulating electric field through at least one receiver coil of a wireless power receiver device and thereby charge the wireless power receiver device,
   wherein the at least one transmitter coil is composed of at least two spirals electrically connected to each other,
   wherein the at least two spirals are oriented in space to form a composed geometric figure,
   wherein the at least one transmitter coil comprises:
   a first port formed by a first wire end of a first spiral of the at least two spirals,
   a second port formed by a first wire end of a second spiral of the at least two spirals,
   a third port formed by a second wire end of the first spiral of the at least two spirals,
   a fourth port formed by a second wire end of the second spiral of the at least two spirals,
   a first electrical connection electrically connecting one of the first and third ports of the first spiral with one of the second and fourth ports of the second spiral, and
   a second electrical connection electrically connecting the other port of the first and third ports of the first spiral with the other port of the second and fourth ports of the second spiral, and
   wherein the second electrical connection connects the first spiral and the second spiral to a capacitor or a capacitor network.

2. The wireless power transmitter device of claim 1, wherein the at least two spirals are symmetrically positioned in space towards a common reference point or axis.

3. The wireless power transmitter device of claim 1, wherein the first electrical connection joins the first spiral with the second spiral by a material of the same conductivity as a material of the spirals.

4. The wireless power transmitter device of claim 1,
   wherein an equivalent capacitance of the capacitor or the capacitor network is used to create an electrical resonator at a resonance frequency in conjunction with a self-inductance of the at least one transmitter coil; and
   wherein the electrical resonator is driven by an AC source.

5. The wireless power transmitter device of claim 1, comprising at least two transmitter coils, wherein a first transmitter coil of the at least two transmitter coils faces a second transmitter coil of the at least two transmitter coils under a folding angle of 90 degrees; and wherein the first and the second transmitter coils are positioned at the same or different height with respect to each other.

6. The wireless power transmitter device of claim 5, comprising a single-spiral coil that is located on top of the first and the second transmitter coils.

7. The wireless power transmitter device of claim 1, comprising four transmitter coils, wherein each transmitter coil is composed of a first and a second spiral arranged with respect to each other under a folding angle of 90 degrees,
wherein all four transmitter coils are arranged with respect to each other under a folding angle of 90 degrees, and
wherein each first spiral of a transmitter coil of the four transmitter coils overlaps with a second spiral of another transmitter coil of the four transmitter coils located next to the transmitter coil.

8. The wireless power transmitter device of claim 1, comprising three transmitter coils, wherein each transmitter coil is composed of a first and a second spiral arranged with respect to each other under a folding angle of 60 degrees,
wherein all three transmitter coils are arranged with respect to each other under a folding angle of 60 degrees,
wherein each first spiral of a transmitter coil of the three transmitter coils overlaps with a second spiral of another transmitter coil of the three transmitter coils located next to the transmitter coil.

9. The wireless power transmitter device of claim 1, comprising four transmitter coils, wherein each transmitter coil is composed of a first and a second spiral arranged with respect to each other under a folding angle of 90 degrees,
wherein all four transmitter coils are arranged with respect to each other under a folding angle of 90 degrees,
wherein the first spirals of the four transmitter coils are arranged in a first plane,
wherein the second spirals of two transmitter coils of the four transmitter coils are arranged in a second plane perpendicular to the first plane, and
wherein the second spirals of the other two transmitter coils of the four transmitter coils are arranged in a third plane perpendicular to both the first and the second plane.

10. The wireless power transmitter device of claim 1, comprising two transmitter coils, wherein each transmitter coil is composed of a first and a second spiral bent with respect to each other under a radius of curvature, and
wherein the two transmitter coils are bent with respect to each other under a radius of curvature.

11. The wireless power transmitter device of claim 1, comprising an arrangement of at least two transmitter coils, wherein the arrangement of the at least two transmitter coils has a cuboid, spherical or semi-planar shape.

12. The wireless power transmitter device of claim 1, wherein the at least one transmitter coil is configured to receive a second time varying electromagnetic field that produces the time-varying voltage.

13. The wireless power transmitter device of claim 12, wherein the second time varying electromagnetic field is produced by another wireless power transmitter device, and wherein the wireless power transmitter device is configured as a wireless power relay for wireless power transmission from the another wireless power transmitter device to the wireless power receiver device.

14. The wireless power transmitter device of claim 1, further comprising:
at least one AC power source providing the time-varying voltage for excitation of the at least one inductive-capacitive resonator of the at least one transmitter coil; and
a phase and amplitude controller configured to control at least one of a magnitude or a phase of the at least one AC power source based on a sensing signal indicating a location of a wireless power receiver device.

15. The wireless power transmitter device of claim 14, comprising:
a power detection unit configured to detect a change in an electromagnetic coupling of the at least one inductive-capacitive resonator of the at least one transmitter coil with a corresponding resonator of the wireless power receiver device,
wherein the power detection unit is configured to provide the sensing signal based on the detected change in the electromagnetic coupling of the at least one inductive-capacitive resonator of the at least one transmitter coil.

16. The wireless power transmitter device of claim 14, comprising:
a power detection unit configured to detect a change in an electromagnetic coupling of at least one inductive-capacitive resonator of a sensing coil with a corresponding resonator of the wireless power receiver device,
wherein the at least one inductive-capacitive resonator of the sensing coil is configured to operate at another operating frequency than the at least one inductive-capacitive resonator of the at least one transmitter coil, and
wherein the power detection unit is further configured to provide the sensing signal based on the detected change in the electromagnetic coupling of the at least one inductive-capacitive resonator of the sensing coil.

* * * * *